(12) United States Patent
Likhterman et al.

(10) Patent No.: US 10,915,105 B1
(45) Date of Patent: Feb. 9, 2021

(54) PREEMPTIVE LOGICAL CONFIGURATION OF VEHICLE CONTROL SYSTEMS

(71) Applicant: Allstate Insurance Company, Northbrook, IL (US)

(72) Inventors: Aleksandr Likhterman, Wheeling, IL (US); Sunil Chintakindi, Menlo Park, CA (US); Harini Anand, Hawthorn Woods, IL (US)

(73) Assignee: Allstate Insurance Company, Northbrook, IL (US)

( * ) Notice: Subject to any disclaimer, the term of this patent is extended or adjusted under 35 U.S.C. 154(b) by 228 days.

(21) Appl. No.: 16/016,903

(22) Filed: Jun. 25, 2018

(51) Int. Cl.
*G05D 1/02* (2020.01)

(52) U.S. Cl.
CPC ......... *G05D 1/0214* (2013.01); *G05D 1/0221* (2013.01); *G05D 1/0276* (2013.01)

(58) Field of Classification Search
None
See application file for complete search history.

(56) References Cited

U.S. PATENT DOCUMENTS

| | | | |
|---|---|---|---|
| 8,457,827 B1 | 6/2013 | Ferguson et al. | |
| 9,120,484 B1 | 9/2015 | Ferguson et al. | |
| 9,229,905 B1 | 1/2016 | Penilla et al. | |
| 9,361,409 B2 | 6/2016 | Kozloski et al. | |
| 9,390,451 B1 | 7/2016 | Slusar | |
| 9,529,361 B2 | 12/2016 | You et al. | |
| 9,587,952 B1 | 3/2017 | Slusar | |
| 9,623,876 B1 | 4/2017 | Slusar | |
| 9,766,625 B2 | 9/2017 | Boroditsky et al. | |
| 9,816,827 B1 | 11/2017 | Slusar | |
| 10,024,684 B2 * | 7/2018 | Wang ................ | G01C 21/3697 |
| 2013/0166098 A1 | 6/2013 | Lavie et al. | |
| 2014/0019167 A1 | 1/2014 | Cheng et al. | |
| 2014/0310788 A1 | 10/2014 | Ricci | |
| 2015/0248131 A1 | 9/2015 | Fairfield et al. | |

(Continued)

FOREIGN PATENT DOCUMENTS

WO    2017142917 A1    8/2017

OTHER PUBLICATIONS

Sep. 13, 2019—(WO) International Search Report & Written Opinion—PCT/US19/38915.

(Continued)

*Primary Examiner* — Todd Melton
(74) *Attorney, Agent, or Firm* — Banner & Witcoff, Ltd.

(57) ABSTRACT

Apparatuses, systems, methods, and computer-readable media are provided for the preemptive logical configuration of vehicle control systems. A vehicle control computer may determine a location of a vehicle. The vehicle control computer may query a historical data source server for historical incident data corresponding to a first vicinity around the first location of the vehicle. Based on the historical incident data, the vehicle control computer may identify one or more driving danger areas in the first vicinity around the first location of the vehicle, wherein each of the one or more driving danger areas are associated with one or more driving hazards. The vehicle control computer may generate a configuration for vehicle operation in the first vicinity around the first location of the vehicle based on the one or more driving danger areas and may update driving logic of the vehicle with the configuration.

20 Claims, 14 Drawing Sheets

(56) References Cited

U.S. PATENT DOCUMENTS

| | | | |
|---|---|---|---|
| 2016/0086397 | A1 | 3/2016 | Phillips |
| 2016/0101728 | A1 | 4/2016 | Chan |
| 2017/0067385 | A1 | 3/2017 | Hunt |
| 2017/0297586 | A1 | 10/2017 | Li |
| 2017/0305437 | A1 | 10/2017 | Onorato et al. |
| 2017/0313322 | A1 | 11/2017 | Onorato et al. |
| 2017/0355377 | A1 | 12/2017 | Vijaya Kumar et al. |
| 2017/0369052 | A1 | 12/2017 | Nagy et al. |
| 2018/0004211 | A1 | 1/2018 | Grimm et al. |
| 2018/0107216 | A1* | 4/2018 | Beaurepaire ....... G06Q 30/0261 |
| 2018/0130095 | A1 | 5/2018 | Khoury |

OTHER PUBLICATIONS

Oct. 31, 2019—(US) Non-Final Office Action—U.S. Appl. No. 16/017,090.

Fugiglandi, et al, "Driving Behavior Analysis through CAN Bus Data in a Uncontrolled Environment," Oct. 9, 2017. retrieved from https://arxiv.org/pdf/1710.04133.pdf, 11 pages.

Geng, et al, "Human-Driver Speed Profile Modeling for Autonomous Vehicle's Velocity Strategy on Curvy Paths," 2016 IEEE Intellient Vehicles Sympooium (IV), Gothenberg, Sweden, Jun. 19-22, 2016, 6 pages.

Al Shihabi, Talal Ahmad, et al, "A framework for modeling human-like driving behaviors for automous vehcles in driving simulators," Conference Paper, Jan. 2001, retrieved from www.https//www.researchgate.net/publication/220794224, 7 pages.

Pendleton, Scott Drew, et al, "Perception, Planning, Control, and Coordination for Autonomous Vehicles," Machines 2017. 5(1), 6; doi:10.3390, retrieved from http://www.mdpi.com/2075-1702/5/1/6, 54 pages.

Meiring, Gys Albertus Mathinus, et al, "A Review of Intelligent Driving Style Analysis Systems and Reated Artificial Intelligenge Algorithms," published Dec. 4, 2015, retrieved from http://www.mdpi.com/1424-8220/15/12/29822, 30 pages.

* cited by examiner

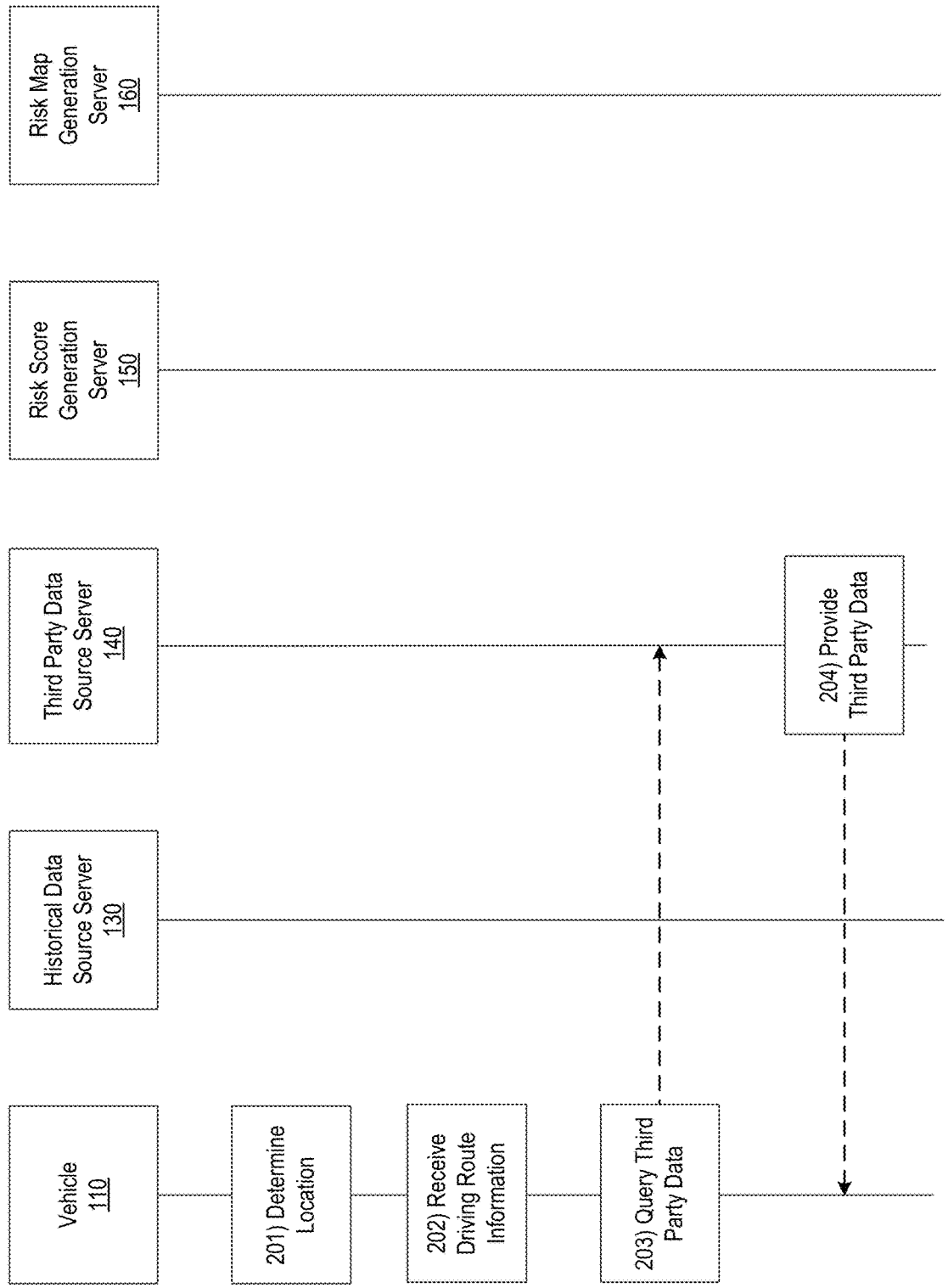

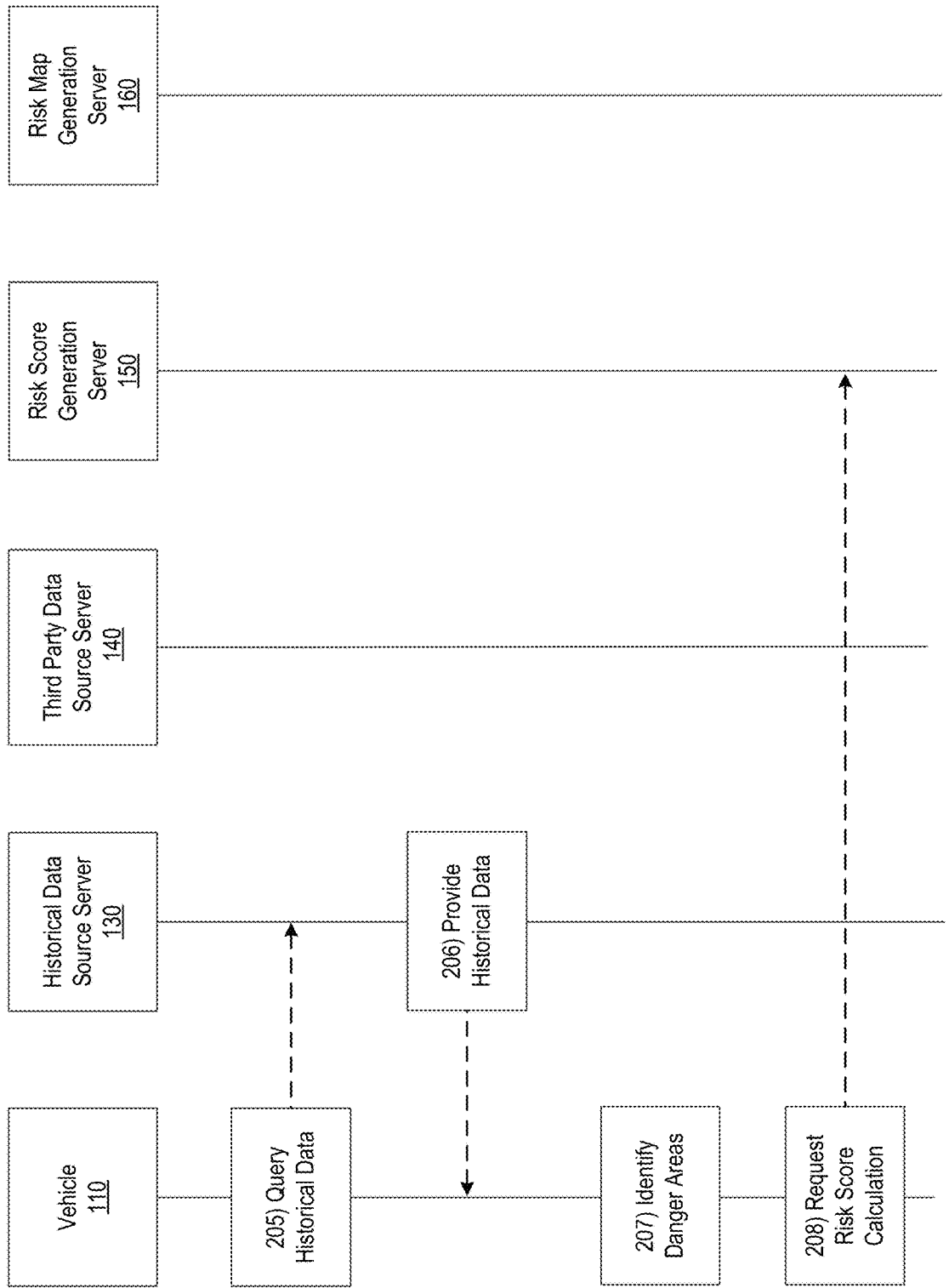

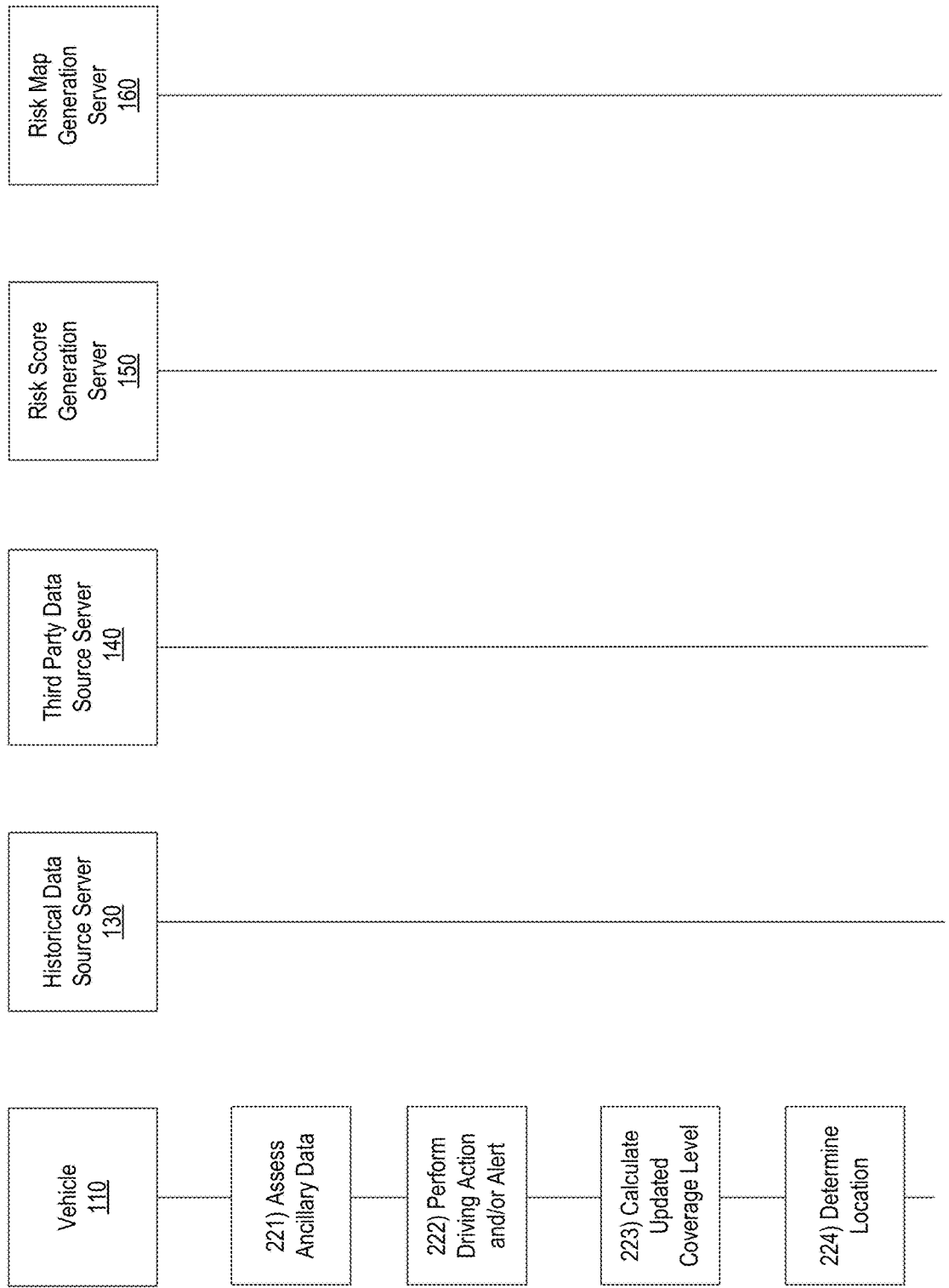

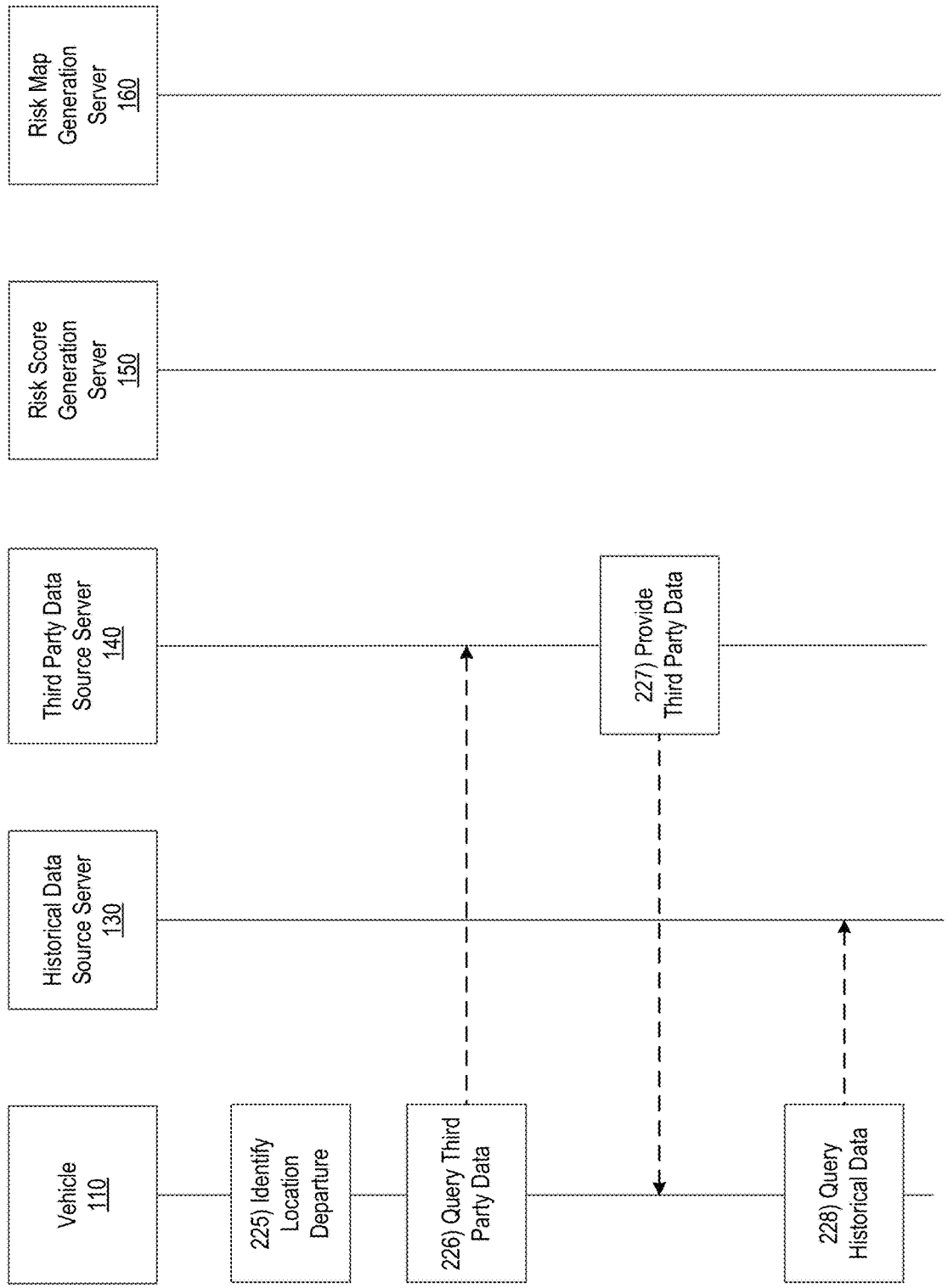

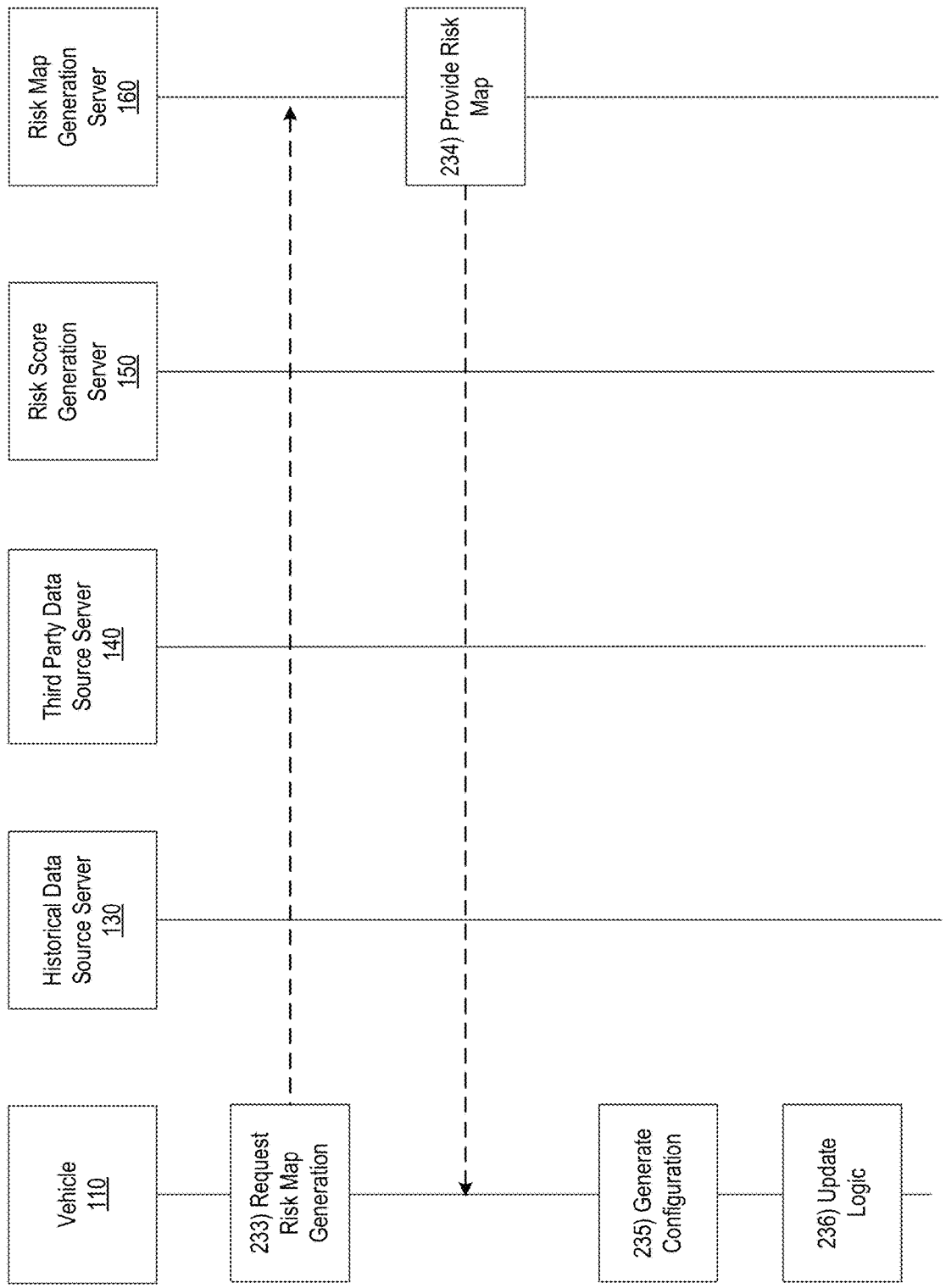

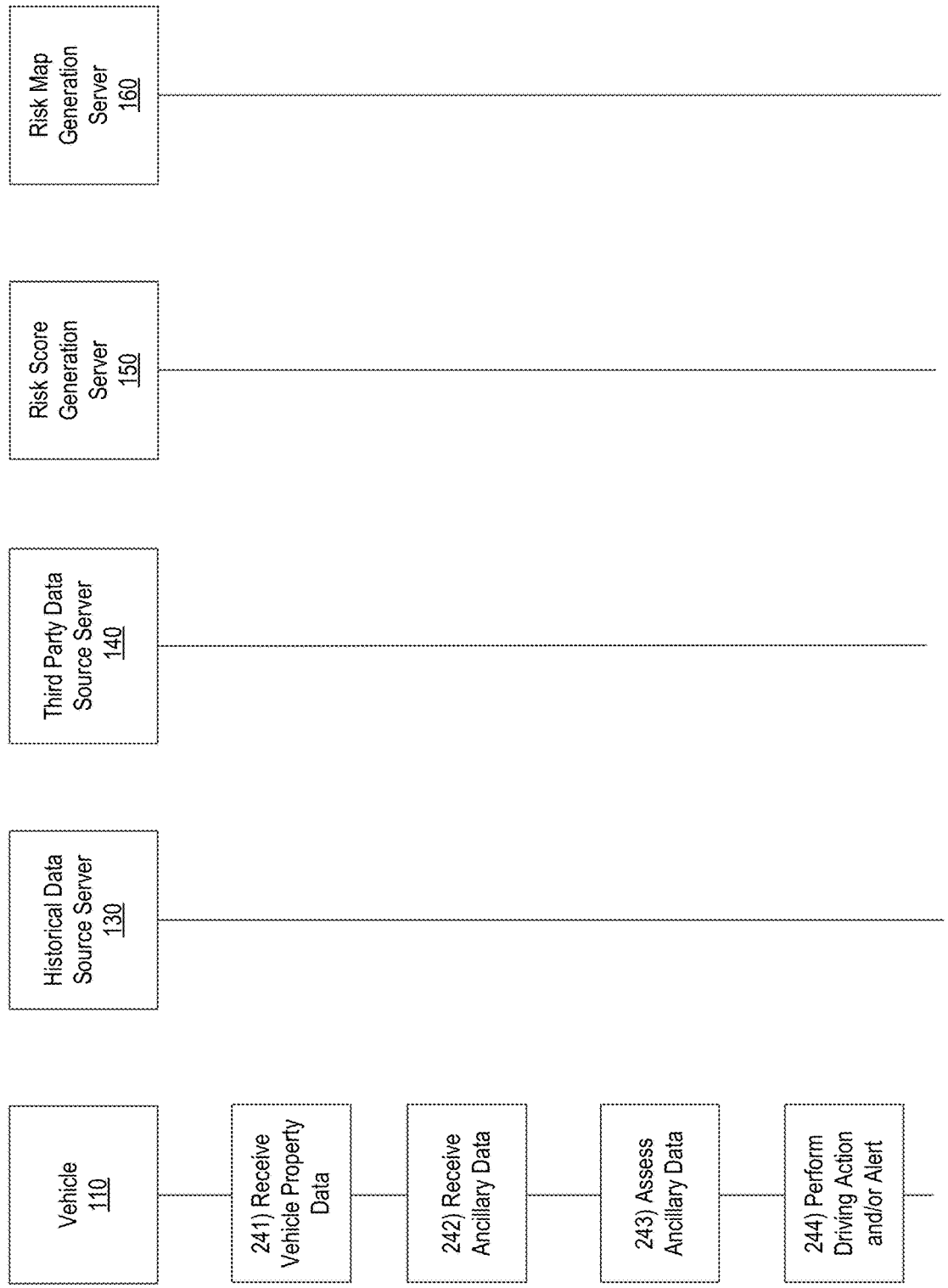

PREEMPTIVE LOGICAL CONFIGURATION OF VEHICLE CONTROL SYSTEMS

CROSS-REFERENCE TO RELATED APPLICATIONS

This application is related to U.S. application Ser. No. 16/017,090 entitled "Logical Configuration of Vehicle Control Systems Based on Driver Profiles", which is being filed concurrently with this application and which is incorporated herein by reference in its entirety.

TECHNICAL FIELD

Aspects described herein generally relate to autonomous, semi-autonomous, and non-autonomous vehicle control systems. More specifically, aspects relate to configuring vehicle control systems based on areas known for driving hazards proximate to a location of a vehicle to cause the vehicle control systems to prioritize assessment of ancillary data for the driving hazards while the vehicle is in the known areas.

BACKGROUND

Each year vehicle accidents account for thousands of deaths and millions of serious injuries. While autonomous and semi-autonomous car systems are poised to significantly reduce the number of vehicle accidents and, by extension, the number of accident related fatalities and injuries, such systems are often insufficient with respect to the early detection of driving hazards in an immediate time frame and providing responses (e.g., driver alerts and vehicle actions) following the detection of such driving hazards. Thus, arrangements for the early detection of driving hazards and providing responses to the detection of such hazards may be advantageous in preventing accidents and furthering motor vehicle safety.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations such as those described above, and to overcome other limitations that will be apparent upon reading and understanding the present specification, aspects described herein are directed to apparatuses, systems, and methods for the preemptive logical configuration of vehicle control systems.

In accordance with one or more embodiments, a vehicle control computer may determine a first location of a vehicle. The vehicle control computer may query a historical data source server for historical incident data corresponding to a first vicinity around the first location of the vehicle. Based on the historical incident data, the vehicle control computer may identify one or more driving danger areas in the first vicinity around the first location of the vehicle, wherein each of the one or more driving danger areas are associated with one or more driving hazards. The vehicle control computer may generate a configuration for vehicle operation in the first vicinity around the first location of the vehicle based on the one or more driving danger areas and may update driving logic of the vehicle with the configuration.

In some embodiments, during vehicle operation in the first vicinity around the first location of the vehicle, the vehicle control computer may compare a first instant location of the vehicle with each of the one or more driving danger areas. Responsive to determining that the first instant location of the vehicle corresponds to at least one of the one or more driving danger areas, the vehicle control computer may increase an assessment priority of the one or more driving hazards corresponding to the at least one of the one or more driving danger areas.

In some embodiments, the vehicle control computer may assess ancillary data for each of the one or more driving hazards based on increasing the assessment priority of the one or more driving hazards. Responsive to identifying at least one of the one or more driving hazards, the vehicle control computer may perform one or more of a driving action and a driving alert based on the configuration for vehicle operation.

In some embodiments, the vehicle control computer may receive an expected driving route from the first location of the vehicle to a destination point, wherein identifying the historical incident data is performed relative to the expected driving route, and wherein identifying the one or more driving danger areas is performed relative to the expected driving route.

In some embodiments, during vehicle operation along the expected driving route, the vehicle control computer may identify that the vehicle has departed from the expected driving route. The vehicle control computer may determine a second location of the vehicle, wherein the second location is a point at which the vehicle departed from the expected driving route. The vehicle control computer may query historical incident data corresponding to a second vicinity around the second location of the vehicle. Based on the historical incident data, the vehicle control computer may identify one or more driving danger areas in second vicinity around the second location of the vehicle, wherein each of the one or more driving danger areas is associated with one or more driving hazards. The vehicle control computer may generate an updated configuration for vehicle operation in the second vicinity around the second location of the vehicle based on the one or more driving danger areas and may update driving logic of the vehicle with the configuration.

In some embodiments, during vehicle operation in the second vicinity around the second location of the vehicle, the vehicle control computer may compare a second instant location of the vehicle with each of the one or more driving danger areas. Responsive to determining that the second instant location of the vehicle corresponds to at least one of the one or more driving danger areas, the vehicle control computer may increase an assessment priority of the one or more driving hazards corresponding to the at least one of the one or more driving danger areas.

In some embodiments, the vehicle control computer may assess ancillary data for each of the one or more driving hazards based on increasing the assessment priority of the one or more driving hazards. Responsive to identifying at least one of the one or more driving hazards, the vehicle control computer may perform one or more of a driving action and a driving alert based on the configuration for vehicle operation.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 2A-2K depict an illustrative event sequence for the preemptive logical configuration of vehicle control systems in accordance with one or more aspects of the disclosure;

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Figure 1:
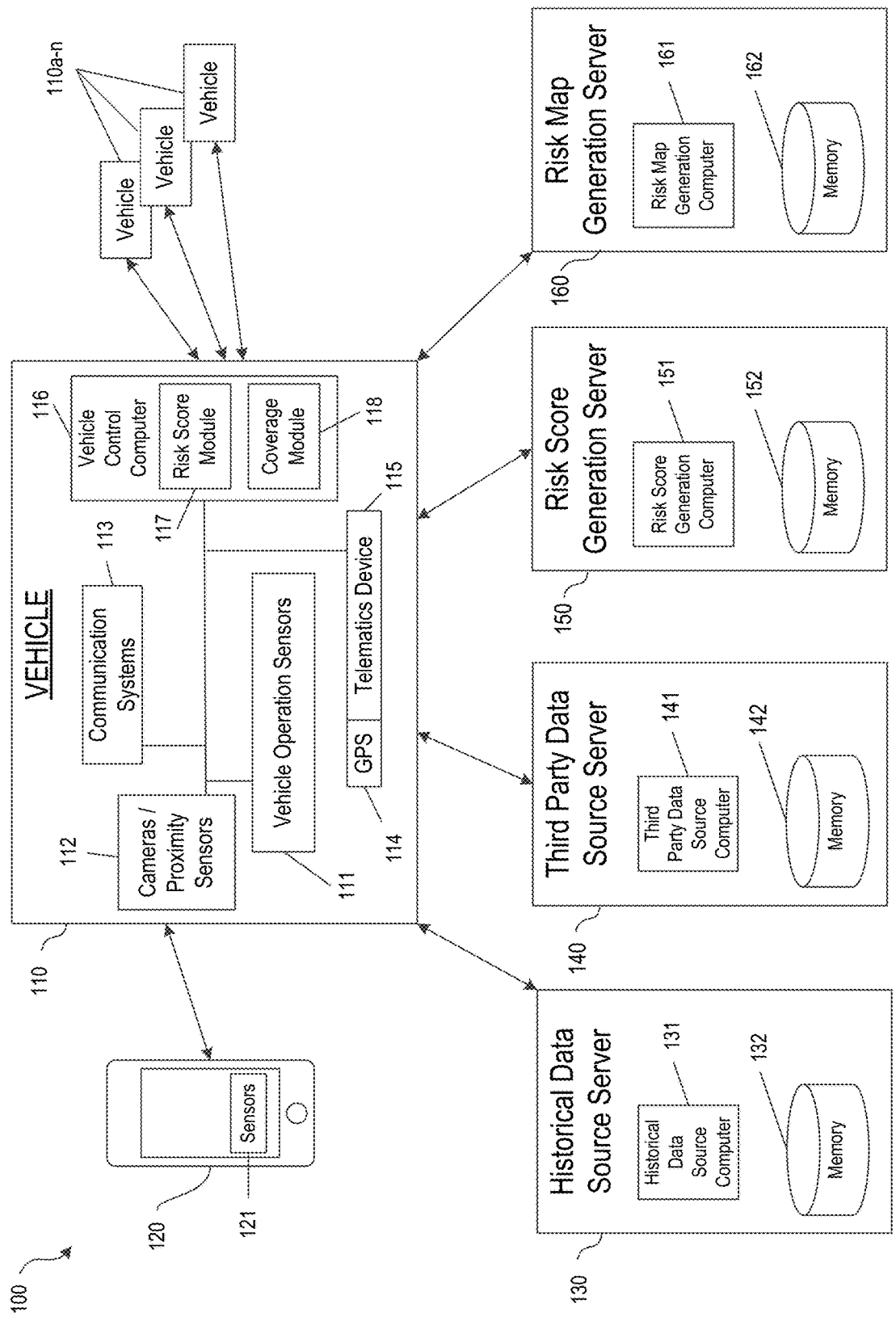
FIG. 1 depicts a diagram illustrating various example components of a vehicle control system according to one or more aspects of the disclosure.

FIG. 1 is a diagram illustrating various example components of a vehicle control system 100 according to one or more aspects of the disclosure. Vehicle control system 100 may include a vehicle 110, one or more additional vehicles 110a-n, a mobile computing device 120, a historical data source server 130, a third party data source server 140, a risk score generation server 150, and a risk map generation server 160. Each component shown in FIG. 1 may be implemented in hardware, software, or a combination of the two. Additionally, each component of vehicle control system 100 may include a computing device (or system) having some or all of the structural components as computing device 401 described below in regard to FIG. 4.

As discussed above, vehicle control system 100 shown in FIG. 1 includes vehicle 110. Vehicle 110 may be an automobile, motorcycle, scooter, bus, van, truck, semi-truck, train, boat, recreational vehicle, or other vehicle. Vehicle 110 may further be an autonomous vehicle, semi-autonomous vehicle, or non-autonomous vehicle. Vehicle control system 100 may further include one or more additional vehicles 110a-n, which may be similar to vehicle 110. In some examples, vehicle 110 may include vehicle operation and environmental conditions sensors 111 capable of detecting, recording, and transmitting various vehicle performance and/or operational data and environmental conditions data. For example, sensors 111 may detect, store, and transmit data corresponding to the vehicle's speed, distances driven, rates of acceleration or braking, and specific instances of sudden acceleration, braking, swerving, and the like. Sensors 111 also may detect, store, and transmit data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, internal decibel levels, maintenance performed on the vehicle, and other data collected by the vehicle's computer systems.

Additional sensors 111 may detect, store, and transmit the environmental and external driving conditions data associated with vehicle 110 including external temperature, precipitation levels, precipitation type, presence of road ice and/or moisture, ambient light levels, presence of fog, and sun position affecting driver visibility. Sensors 111 also may detect, store, and transmit data relating to moving violations and the observance of traffic signals and signs by vehicle 110. Additional sensors 111 may detect, store, and transmit data relating to the maintenance of vehicle 110, such as the engine status, oil level, engine coolant temperature, odometer reading, the level of fuel in the fuel tank, engine revolutions per minute (RPMs), and/or tire pressure. Certain vehicle sensors 111 may determine when and how often vehicle 110 stays in a single lane or strays into other lanes.

Vehicle 110 also may include one or more cameras and proximity sensors 112 capable of recording additional conditions inside and/or outside of vehicle 110. Internal cameras 112 may detect conditions such as the number of the passengers in vehicle 110, and potential sources of driver distraction within the vehicle (e.g., pets, phone usage, and unsecured objects in the vehicle). External cameras and proximity sensors 112 may detect other nearby vehicles, traffic levels, road conditions, traffic obstructions, animals, cyclists, pedestrians, and other conditions that may factor into driving trip and/or driving data analyses.

Certain vehicle sensors 111 and/or cameras and proximity sensors 112 may determine when and how often vehicle 110 stays in a single lane or strays into other lanes. A Global Positioning System (GPS) 114 and/or locational sensors positioned inside vehicle 110, and/or locational sensors or devices external to vehicle 110 may be used to determine the lane position of vehicle 110, as well as road type (e.g., highway, entrance/exit ramp, residential area, two lane highway, four lane highway, etc.), road quality (e.g., paved, gravel, dirt, etc.), and other vehicle position/location data.

Vehicle sensors 111 and/or cameras and proximity sensors 112 may be configured to transmit the vehicle performance and operational data and environmental conditions data to one or more internal computing devices and/or systems including telematics device 115 and/or vehicle control computer 116. Additionally, vehicle sensors 111 and/or cameras and proximity sensors 112 may be configured to independently transmit the above-mentioned data to one or more external computing devices and/or systems including mobile device 120, historical data source server 130, third party data source server 140, risk score generation server 150, and risk map generation server 160. In some instances, the data transmission to the one or more external computing devices and/or systems may be performed via communication systems 113 and/or telematics device 115. In such cases, vehicle sensors 111 and/or cameras and proximity sensors 112 may be configured to transmit data to communications systems 113 and/or telematics device 115 which, in turn, may be configured to transmit the data to the one or more external computing devices and/or systems. The transmission of data, either externally or internally, from vehicle sensors 111 and/or cameras and proximity sensors 112 may occur seamlessly (e.g., live) and in real-time, or may occur in intermittent bursts (e.g., every 5 seconds, 10 seconds, 1 minute, etc.). In some examples, the transmission of data may occur in offset real-time wherein a time delay (e.g., 1 second, 3 seconds, 10 seconds, etc.) buffers the data transmission.

Communication systems 113 may be vehicle-based data transmission systems configured to transmit environmental surroundings and conditions and vehicle performance and operational data to external computing systems and/or other nearby vehicles and infrastructure, and to receive data from external computing systems and/or other nearby vehicles and infrastructure. In some examples, communication systems 113 may use the dedicated short-range communications (DSRC) protocols and standards to perform wireless communications between vehicles and/or external infrastructure such as bridges, guardrails, barricades, and the like.

Communication systems 113 may be implemented using other wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. In certain systems, communication systems 113 may include specialized hardware installed in vehicle 110 (e.g., transceivers, antennas, etc.), while in other examples the communication systems 113 may be implemented using existing vehicle hardware components (e.g., radio and satellite equipment, navigation computers) or may be implemented by software running on mobile computing device 120 of drivers and passengers within vehicle 110. Communication systems 113 may be configured to transmit data provided by vehicle sensors 111 and cameras and proximity sensors 112 to one or more external computing devices and/or vehicles 110a-n. Similarly, communications systems 113 may be configured to receive data from one or more external computing systems and/or vehicles 110a-n, which may be configured with similar sensors, cameras and/or other devices, as described above with respect to vehicle 110. Such data may be utilized in the preemptive logical configuration of vehicle control systems as described herein.

Figure 4:
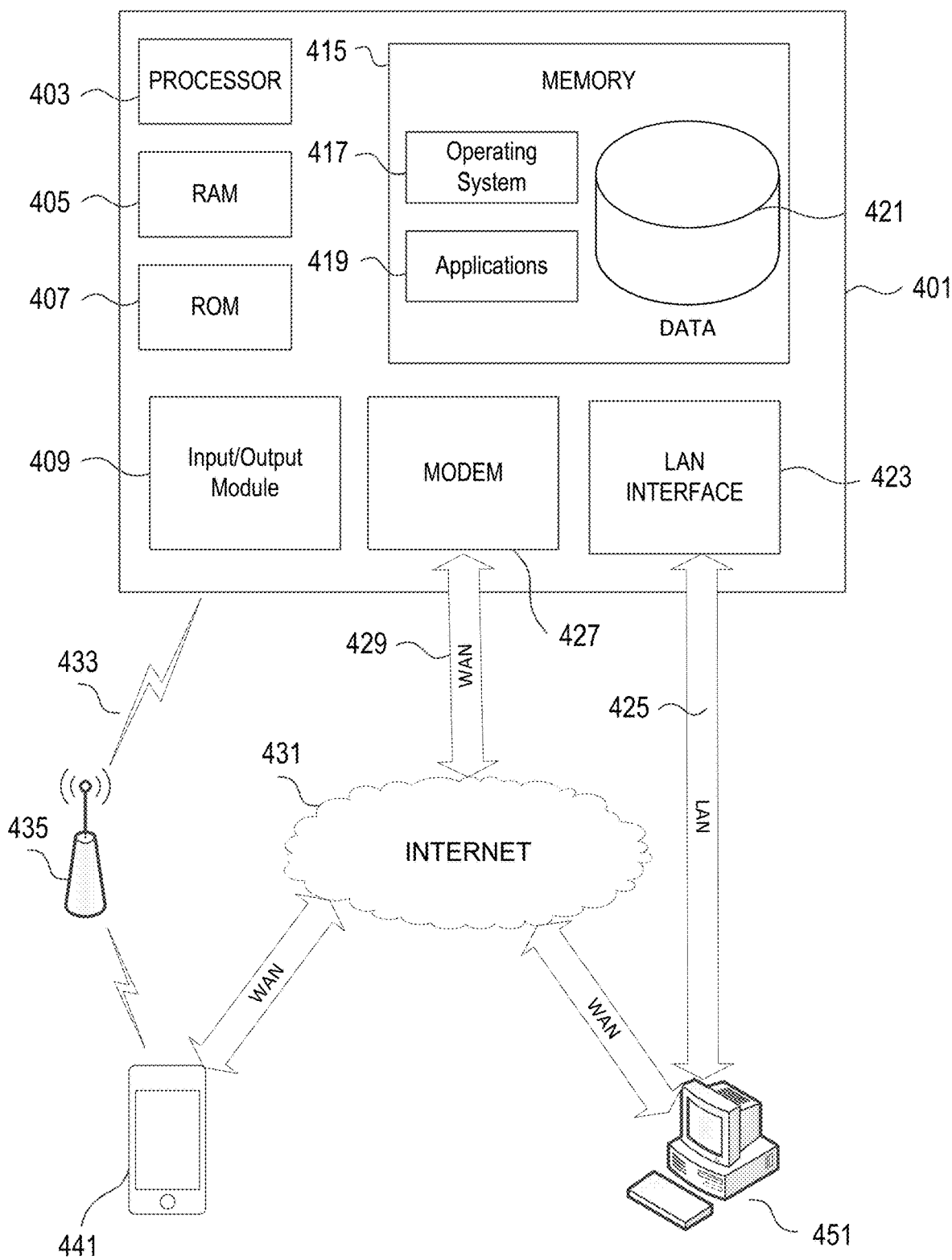
FIG. 4 depicts an example network environment and computing systems that may be used to implement aspects of the disclosure.

Telematics device 115 may be a computing device containing many or all of the hardware/software components as the computing device 401 depicted in FIG. 4. Telematics device 115 may receive vehicle performance and/or operational data and environmental conditions data from vehicle sensors 111 and cameras and proximity sensors 112, and may be configured to transmit the data to one or more external computing devices and/or systems over a wireless transmission network.

Telematics device 115 also may be configured to detect or determine additional types of data relating to real-time driving and the condition of vehicle 110. Telematics device 115 may store information relating to the type of vehicle 110, for example, as well as the make, model, trim (or sub-model), year, and/or engine specifications, and autonomous driving system specifications. Additionally, other information such as vehicle owner or driver information, insurance information, and financing information for vehicle 110 may be stored on telematics device 115.

In some instances, telematics device 115 may be configured to receive data from vehicle sensors 111 and cameras and proximity sensors 112 and to transfer the received data to external computing devices and/or systems including vehicles 110a-n, mobile device 120, historical data source server 130, third party data source server 140, risk score generation server 150, and risk map generation server 150. In other instances, vehicle sensors 111 and cameras and proximity sensors 112 may be configured to directly transmit data to external computing devices and/or systems (e.g., vehicles 110a-n, mobile device 120, historical data source server 130, third party data source server 140, risk score generation server 150, and risk map generation server 160) without using the telematics device. Thus, telematics device 115 may be optional in certain embodiments.

Vehicle control computer 116 may contain some or all of the hardware/software components as the computing device 401 depicted in FIG. 4, and may be configured to operate and/or control aspects of the driving of vehicle 110 in autonomous, semi-autonomous, and/or non-autonomous driving arrangements, including but not limited to, acceleration, braking, steering, and/or route navigation. Furthermore, vehicle control computer 116 may be configured to operate one or more internal vehicle control systems and/or components including at least a vehicle sound system, dashboard display and/or heads-up display system, interior lighting system, climate control system, door locking systems, and the like. Similarly, vehicle control computer 116 may be configured to operate one or more external vehicle control systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 116 may be further configured to activate and/or control one or more of vehicle operation sensors 111, cameras and/or proximity sensors 112, communication systems 113, GPS 114, telematics device 115, and/or or mobile device 120.

In order to perform the functions described herein, vehicle control computer 116 may be configured to receive, analyze, and act upon vehicle performance and operational data provided by vehicle sensors 111 and ancillary data provided by cameras and proximity sensors 112, mobile device 120, and/or third party data source 140. Additionally, vehicle control computer 116 may be configured to receive, analyze, and act upon data provided by vehicles 110a-n, historical data source server 130, third party data source server 140, risk score generation server 150, and risk map generation server 160. Such data may be received through communication systems 113 and/or other on-board communication systems. In certain embodiments, vehicle control computer 116 may also be configured to receive, analyze, and act upon data provided by telematics device 115 and mobile device 120. Such data may be used by vehicle control computer 116 to perform autonomous driving functions, semi-autonomous driving functions, and/or provide any of the driving alerts described herein for vehicle 110 and occupants therein.

Stored in memory, vehicle control computer 116 may include at least risk score module 117 and coverage module 118. Risk score module 117 may store computer-executable instructions which, when executed by processors of vehicle control computer 116, may cause vehicle control computer 116 to calculate risk scores associated with driving danger areas and corresponding driving hazards based off of historical data, as will be described in further detail below. Coverage module 118 may store computer-executable instructions which, when executed by processors of vehicle control computer 116, may cause vehicle control computer 116 to calculate an insurance coverage level and/or premium for driving instances for vehicle 110. The calculation of the coverage level and/or premium for driving instances of vehicle 110 by vehicle control computer 116 may incorporate historical data provided by historical data source server 130, third party data provided by third party data source server 140, vehicle operation data provided by vehicle operation sensors 111, GPS 114, and/or telematics device 115, and/or environmental conditions and surroundings data provided by one or more of cameras and proximity sensors 112 and vehicles 110a-n. Additionally and/or alternatively, the calculation of the coverage level and/or premium for driving instances of vehicle 110 may include risk score data provided by risk score module 117 and/or risk score generation server 150, and/or risk map data provided by risk map generation server 160.

In some instances, coverage module 118 may store instructions which cause vehicle control computer 116 to calculate a preliminary and/or starting coverage level and/or premium for a driving instance of vehicle 110. The calculation of the preliminary and/or starting coverage level and/or premium for the driving instance of vehicle 110 may incorporate at least historical data provided by historical data source server 130 and third party data provided by third party data source server 140 relative to an initial and/or starting location of vehicle 110 and/or based on driving route information for the driving instance. In some instances, the calculation of the preliminary and/or starting coverage level and/or premium for the driving instance of vehicle 110 may further incorporate risk score data provided by risk score module 117 and/or risk score generation server 150 and/or risk map data provided by risk map generation server 160.

The preliminary and/or starting coverage level and/or premium may be based on historical data relating to the vicinity of the location of vehicle 110 and/or along the route corresponding to the route information in relation to immediate and/or projected environmental data around the vicinity of the location of vehicle 110 and/or along the route corresponding to the route information. For example, as will be described in further detail below, coverage module 118 may cause vehicle control computer 110 to calculate a preliminary and/or starting coverage level and/or premium for a driving instance of vehicle 110 based on insurance claims data, accident reports data, historical environmental surroundings and conditions and/or historical vehicle operations data, and ancillary data associated with insurance claims and accident reports data in relation to the location of vehicle 110 and/or based on driving route information for the driving instance and further based on the current and/or projected weather condition data, forecasted weather condition data, traffic flow data, road closure data, and/or other data affecting external driving conditions also associated with the location and/or route information of vehicle 110. In some instances, the calculation of the preliminary and/or starting coverage level and/or premium for the driving instance of vehicle 110 may further incorporate previous and/or historical vehicle operation data relating to vehicle 110. Additionally and/or alternatively, the calculation of the preliminary and/or starting coverage level and/or premium for the driving instance of vehicle 110 may further incorporate risk score data provided by risk score module 118 and/or risk score generation server 150 and/or risk map data provided by risk map generation server 160. In some instances, the calculation of the preliminary and/or starting coverage level and/or premium for the driving instance of vehicle 110 may also incorporate an autonomous driving setting (e.g., fully autonomous, semi-autonomous, non-autonomous, and the like).

The preliminary and/or starting coverage level and/or premium may serve as a baseline point which may be increased and/or decreased during operation of vehicle 110 during the driving instance. For example, the coverage level and/or premium for vehicle 110 during the driving instance may increase and/or decrease based on vehicle operation data provided by vehicle operation sensors 111, GPS 114, and/or telematics device 115 and/or ancillary data provided by one or more of cameras and proximity sensors 112 and vehicles 110a-n. In some instances, the coverage level and/or premium for vehicle 110 during the driving instance may increase and/or decrease based on changes to the historical data provided by historical data source server 130, third party data provided by third party data source server 140, risk score calculated by risk score module 117 and/or risk score generation server 150, and/or risk map calculated by risk map generation server 160. Additionally and/or alternatively, the coverage level and/or premium for the driving instance of vehicle 110 may also increase and/or decrease based on changes to an autonomous driving setting (e.g., fully autonomous, semi-autonomous, non-autonomous, and the like).

In some instances, the increasing and/or decreasing of the coverage level and/or premium of vehicle 110 by vehicle control computer 116 may be based on an overall drive score for the driving instance. For example, the overall drive score may be calculated by incorporating a personal base score of a user/driver of vehicle 110 reflecting prior driving performance of the user/driver based on vehicle operational data, a historical score for a roadway on which vehicle 110 is driving which reflecting the number accidents that have occurred on the roadway, a location score for the roadway reflecting the number of current accidents on the roadway, and a dynamic score reflecting the number of cars on the roadway along with vehicle 110. In some instances, each of the personal base score, historical score, location score, and dynamic score may be multiplied by respective coefficients prior to being added to produce the overall risk score. The coefficients may be determined by one or more machine learning algorithms.

In certain embodiments, mobile computing device 120 may be included within the vehicle 110 and may be used to independently collect vehicle driving data and/or to receive vehicle driving data from one or more vehicle and/or external computing devices and/or systems. Mobile computing device 120 may be, for example, a mobile phone, personal digital assistant (PDA), or tablet computer of the driver or passenger(s) of vehicle 110. Software applications executing on mobile device 120 may be configured to independently detect certain driving data. For example, mobile device 120 may be equipped with one or more accelerometers and/or GPS systems (e.g., sensors 121) which may be accessed by software applications executing on mobile device 120 to determine vehicle location, speed, direction, and other basic driving data. As stated above, mobile computing device 120 may be configured to transmit the independently collected vehicle driving data and/or the received vehicle driving data and environmental conditions data to one or more internal and/or external computing devices and/or systems.

In other examples, software on the mobile device 120 may be configured to receive some or all of the driving data collected by vehicle sensors 111 and cameras and/or proximity sensors 112. Mobile computing device 120 may also be involved with aspects of autonomous and semi-autonomous driving, including receiving, collecting, and transmitting vehicle operational data regarding autonomous and semi-autonomous driving and autonomous and semi-autonomous driving relationships between multiple vehicles. Furthermore, mobile device 120 may be configured to perform the multi-dimensional risk score calculations described in further detail below.

Vehicle control system 100 may include historical data source server 130, containing some or all of the hardware/software components as the computing device 401 depicted in FIG. 4. Historical data source 130 may comprise a historical data source computer 131 for receiving and/or processing historical data including insurance claims, accident reports, historical environmental surroundings and conditions and/or historical vehicle operations data and ancillary data associated with insurance claims and accident reports. Historical data source server 130 may also comprise memory 132 used to store the historical data collected by historical data source computer 131. Historical data source computer 131 may transmit the historical data to vehicle 110 for aiding in the performance of the preemptive logical configuration of vehicle control systems as described herein.

System 100 may include third party data source server 140, containing some or all of the hardware/software components as the computing device 401 depicted in FIG. 4. Third party data source server 140 may comprise a third party data source computer 141 for receiving and/or processing third party data including current weather condition data, forecasted weather condition data, traffic flow data, road closure data, and/or other data affecting external driving conditions. Third party data source server 140 may also comprise memory 142 used to store the third party data collected by third party data source computer 141. Third party data source computer 141 may transmit the third party data to vehicle 110 for aiding in the preemptive logical configuration of vehicle control systems as described herein.

System 100 may include risk score generation server 150 containing some or all of the hardware/software components as the computing device 401 depicted in FIG. 4. Risk score generation server 150 may include hardware, software, and network components to receive data from one or more data sources, such as vehicle 110 (e.g., via communication systems 113, telematics device 115, vehicle control computer 116, etc.), one or more additional vehicles 110a-n, mobile computing device 120, historical data source 130, third party data source 140, risk map generation server 160, and other data sources. Risk score generation server 150 may include memory 152, which may include additional data for the risk score generation server 150 to process and/or generate, for example, one or more risk scores. Risk score generation computer 151 may analyze data received from the various data sources. Risk score generation server 150 may initiate communication with and/or retrieve data from vehicle 110, one or more additional vehicles 110a-n, mobile computing device 120, historical data source 130, third party data source 140, risk map generation server 160, and other data sources wirelessly, or by way of separate computing systems over one or more computer networks (e.g., the Internet). In some instances, vehicle control computer 116 may include a risk score module 117 which may provide vehicle control computer 116 with a similar ability to generate one or more risk scores as compared to risk score server 150.

Risk scores may be determined for one or more of the data values determined by the vehicle sensors 111, cameras and/or proximity sensors 112, telematics device 115, mobile computing device 120, historical data source server 130, third party data source server 140, and the like. For example, risk scores may be determined for one or more of the vehicle performance and/or operational data variables including vehicle speed, acceleration, breaking, and the like, one or more of the internal vehicle systems data variables including turn signal usage, hazard light usage, windshield wiper usage, and the like, one or more of the environmental conditions data variables including precipitation levels, precipitation types, ambient light levels, and the like, and so on (e.g., vehicle operator data and ancillary data). Additionally, risk scores may be determined for vehicle performance and/or operational data received from one or more additional vehicle 110a-n.

The calculation of the risk scores may be performed by risk score generation server 150 and/or risk score module 117. In calculating the risk scores, risk score generation server 150 and/or risk score module 117 may incorporate data provided by historical data source server 130. In some examples, risk scores determined for each variable may be summed to determine an overall risk score. The risk score may be a number from 0 to 100 wherein 0 represents minimal risk and 100 represents maximum risk. Furthermore, the risk scores may be calculated seamlessly and in real-time based on changes in the vehicle performance and/or operational data, environmental conditions data, traffic data, route data, and the like as described above. The risk scores may only be calculated for data having an impact in the near short term (e.g., 5 seconds to 5 minutes).

In some arrangements, the calculation of the risk scores may be performed by risk score generation server 150 and/or risk score module 117 in relation to particular areas in the vicinity of vehicle 110 and/or particular areas along an intended route of vehicle 110. For example, risk score generation server 150 and/or risk score module 117 may identify a location of vehicle 110, and may calculate risk scores for one or more areas in the vicinity of vehicle 110, and/or one or more areas along an intended route of vehicle 110, known for driving hazards based on data provided by one or more of vehicles 110a-n, historical data source server 130, third party data source server 140, and/or risk map generation server 160. In some instances, the vicinity around the location of vehicle 110 may be defined by predetermined area and/or in relation to a driving route specified by a user/driver of the vehicle. The risk scores calculated by risk score generation server 150 and/or risk score module 117 may identify one or more danger areas in the vicinity of the location of vehicle 110 with known driving hazards. In some instances, vehicle control computer 116 and/or vehicle control systems of vehicle 110 may be configured based on the risk scores. Based on the configuration, vehicle control computer 116 and/or vehicle control systems of vehicle 110 may identify whether or not a location of vehicle 110 corresponds to location associated with a risk score. If so, vehicle control computer 116 and/or vehicle control systems of vehicle 110 may prioritize assessment of environmental data to identify driving hazards corresponding to the risk score while the vehicle is in the driving danger area.

System 100 may include risk map generation server 160, containing some or all of the hardware/software components as the computing device 401 depicted in FIG. 4. Risk map server 160 may include hardware, software, and network components to receive data from one or more data sources, such as vehicle 110 (e.g., via communication systems 113, telematics device 115, vehicle control computer 116, etc.), one or more additional vehicles 110a-n, mobile computing device 120, historical data source server 130, third party data source server 140, risk score generation server 150, and other data sources. Risk map server 160 may include memory 162, which may include additional data for risk map server 160 to generate, for example, one or more risk maps. Risk map computer 161 may analyze data received from the various data sources. Risk map server 160 may initiate communication with and/or retrieve data from vehicle 110, one or more additional vehicles 110a-n, mobile computing device 120, historical data source 130, third party data source 140, risk score generation server 150, and other data sources wirelessly, or by way of separate computing systems over one or more computer networks (e.g., the Internet).

In some arrangements, risk map generation server 160 may operate in tandem with risk score generation server 150 in order to produce a risk map corresponding to the vicinity around the location and/or intended route of vehicle 110. In particular, risk map generation server 160 may generate a dynamically alterable risk map which is populated by the totality of driving danger areas identified the risk scores calculated by risk score generation server 150. Vehicle control computer 116 and/or vehicle control systems of vehicle 110 may be configured by the risk map generated by risk map generation server 160. Based on the configuration, vehicle control computer 116 and/or vehicle control systems of vehicle 110 may identify whether or not a location of vehicle 110 corresponds to location associated with a risk score. If so, vehicle control computer 116 and/or vehicle control systems of vehicle 110 may prioritize assessment of environmental data to identify driving hazards corresponding to the risk score while the vehicle is in the driving danger area. In some instances, the risk map may be generated by risk map generation server 160 responsive to receiving an intended driving route of vehicle 110 from driver of vehicle 110.

In some instances, risk score generation server 150 and risk map generation server 160 may associated with a same computing device configured to perform the functionality of both risk score generation server 150 and risk map generation server 160. In such instances, the risk score generation processes may be performed by the computing device through execution of computer-executable instructions stored in a risk score generation module. Similarly, the risk map generation processes may be performed by the computing device through execution of computer-executable instructions stored in a risk map generation module. The computing device may have a memory which may store data commonly accessible between the risk score generation module and risk map generation module.

Vehicle control computer 116 may pull data, seamlessly and in real-time, from any one, or combination of, one or more additional vehicles 110a-n, vehicle sensors 111, cameras and proximity sensors 112, GPS 114, telematics device 115, mobile device 120, historical data source server 130, third party data source server 140, risk score generation server 150, and/or risk map generation server 160. The data provided may enable vehicle control computer 116 to perform autonomous and semi-autonomous driving actions for vehicle 110 and/or provide one or more driving alerts based on the preemptive logical configuration of vehicle control systems as described herein.

FIGS. 2A-2K depict an illustrative event sequence for the preemptive logical configuration of vehicle control systems in accordance with one or more illustrative aspects described herein. While the steps of the event sequence of FIGS. 2A-2K are described in a particular order, it should be understood that the steps may be performed in any order without departing from the scope of the disclosure provided herein. Furthermore, even though the event sequence is described as being performed by a particular arrangement of computing devices (e.g., vehicle control computer 116, historical data source server 130, risk score generation server 150, and risk map generation server 160) the processes may be performed by a number of computing devices greater or less than those described in regard to FIGS. 2A-2K. For example, vehicle control computers 116, historical data source servers 130, risk score generation servers 150, risk map generation servers 160, and other computing devices may be used in the preemptive logical configuration of vehicle control systems without departing from the scope of the disclosure provided herein.

Referring to FIG. 2A, at step 201, vehicle control computer 116 of vehicle 110 may determine a location of vehicle 110. In particular, vehicle control computer 116 may activate GPS 114 of vehicle 110 to determine the location of vehicle 110. In some instances, vehicle control computer 116 may query and/or activate one or more of telematics device 115 and mobile device 120 in order to receive location data to determine the location of vehicle 110. The determining of the location of vehicle 110 may be performed by vehicle control computer 116 upon receipt of an unlock request from a key fob and/or key of vehicle 110, entry into vehicle 110 by a user/driver of vehicle 110, ignition of an engine of vehicle 110, and/or responsive to receipt of driving route information from a user/driver and/or passenger of vehicle 110. Additionally and/or alternatively, the determining of the location of vehicle 110 may be performed by vehicle control computer 116 responsive to termination of operation of vehicle 110 (e.g., turning off of the engine of vehicle 110), entry of the key fob, key, and/or mobile device 120 into the cabin of vehicle 110, and/or in response to other factors such as activation of a driver seat weight sensor, receipt of a location determination request provided by the user/driver and/or passenger, and so on.

At step 202, vehicle control computer 116 of vehicle 110 may optionally receive driving route information from a user/driver and/or passenger of vehicle 110. In some instances, the driving route information may include a starting point and destination provided by the user/driver and/or passenger of vehicle 110 through an input/output interface associated with vehicle control computer 116. However, if the location of vehicle 110 was determined at step 201, then the user/driver and/or passenger of vehicle 110 may not need to provide starting point information. Additionally and/or alternatively, vehicle control computer 116 may receive the driving route information from the user/driver and/or passenger of vehicle 110 from mobile device 120.

At step 203, vehicle control computer 116 of vehicle 110 may query third party data source server 140 for environmental data. In particular, vehicle control computer 116 may query third party data source server 140 based on the location of vehicle 110 identified at step 201 in order to determine current weather condition data, forecasted weather condition data, traffic flow data, road closure data, and/or other data affecting external driving conditions of vehicle 110 in a vicinity around the location of vehicle 110. In instances in which the user/driver and/or passenger of vehicle 110 provided driving route information at step 202, vehicle control computer 116 may further include the driving route information in the query to third party data source server 140. Additionally and/or alternatively, vehicle control computer 116 may command and/or instruct one or more of telematics device 115 and mobile device 120 to request the environmental data from third party data source server 140.

At step 204, third party data source server 140 may provide the environmental data to vehicle control computer 116. In some instances, third party data source server 140 may provide the environmental data to one or more of telematics device 115 and mobile device 120 which in turn may provide the environmental data to vehicle control computer 116 of vehicle 110.

In the event that vehicle control computer 116 provided driving route information to third party data source server 140, third party data source server 140 may return environmental data to vehicle control computer 116 corresponding to the driving route information provided. In some instances, the environmental data provided by third party data source server 140 may be anticipatory to the driving route corresponding to the driving route information. As an illustrative, non-limiting example, the progression of vehicle 110 along the driving route may be projected to take four hours and involve passing through a first city at a two hour mark and a second city at a four hour mark. Third party data source server 140 may provide environmental data to vehicle control computer 116 which anticipates expected environmental data to be expected by vehicle 110 two hours into the future in relation to the first city and four hours into the future in relation to the second city. It is noted that the data provisioning may be done for the total continuity of the driving route, rather than on a city-by-city basis.

Alternatively, in the event that vehicle control computer 116 provided location information relating to vehicle 110 to third party data source server 140, third party data source server 140 may return environmental data to vehicle control computer 116 corresponding to a vicinity around the location of vehicle 110. In some instances, the vicinity may be a predetermined area surrounding the location of vehicle 110 which may be determined by previous driving habits of the user/driver of vehicle 110, available data, and/or based on certain radial distance (e.g., 5 miles, 10 miles, 100 miles, and the like) around the location of vehicle 110.

Referring to FIG. 2B, at step 205, vehicle control computer 116 of vehicle 110 may query historical data from historical data source server 130 to identify historical incident data. In particular, vehicle control computer 116 may query historical data source server 130 to identify historical incident data including insurance claims data, accident reports data, historical environmental surroundings and conditions and/or historical vehicle operations data and ancillary data associated with insurance claims and accident reports data, and so on. The query provided to historical data source server 130 by vehicle control computer 116 may include one or more of the location information and/or route information corresponding to vehicle 110 and the environmental data provided by third party data source server 140. In some instances, vehicle control computer 116 may command and/or instruct one or more of telematics device 115 and mobile device 120 to request the historical data from historical data source server 130.

At step 206, historical data source server 130 may provide the historical data to vehicle control computer 116. In some instances, historical data source server 130 may provide the historical data to one or more of telematics device 115 and mobile device 120 which in turn may provide the historical data to vehicle control computer 116 of vehicle 110.

In the event that vehicle control computer 116 provided driving route information to historical data source server 130, historical data source server 130 may return historical data to vehicle control computer 116 corresponding to the driving route information provided. Alternatively, in the event that vehicle control computer 116 provided location information relating to vehicle 110 to historical data source server 130, historical data source server 130 may return historical data to vehicle control computer 116 corresponding to a vicinity around the location of vehicle 110.

At step 207, vehicle control computer 116 of vehicle 110 may identify one or more driving danger areas in the vicinity around the location of vehicle 110 based on the historical data provided by historical data source server 130. In instances in which the user/driver and/or passenger provided driving route information at step 202, vehicle control computer 116 may identify one or more driving danger areas along the route corresponding to the driving route information based on the historical data provided by historical data source server 130. In some instances, the identification of the one or more driving danger areas may be further based on the third party data provided by third party data source server 140. Additionally, the identification of the one or more driving areas may be performed in relation to the date and time at which the driving instance is occurring.

The one or more danger areas may be particular locations relative to the location of vehicle 110 which may correspond to a predetermined number (e.g., 5, 10, 50, 100, and the like) of insurance claims and/or accident reports. In some instances, the one or more danger areas may describe specific geographical locations (e.g., intersections, highway merging points, overpasses, particular points of curvature on a roadway, and the like) and/or specific geographical areas (e.g., particular stretch of highway, roadway, and the like) corresponding to a predetermined number of insurance claims and/or accident reports.

Additionally, each of the one or more danger areas may be associated with one or more driving hazards. The driving hazards may include anything external a vehicle which contributed to the filing of the insurance claims and/or accident reports. For example, driving hazards may include vehicle collisions, extreme and/or severe weather, roadway obstacles such as children, animals, and the like, and so on. In some instances, the identification of the one or more driving danger areas may occur based on analysis of the external driving events and/or circumstances (e.g., driving hazards) that contributed to the filing of the insurance claims and/or accident reports. Additionally, the identification of the one or more driving danger areas in relation to the external driving events may be further based on the date and time at which the driving instance is occurring.

At step 208, vehicle control computer 116 may request risk score calculation from risk score generation server 150. In some instances, the request for risk score calculation may from vehicle control computer 116 to risk score generation server 150 may involve the one or more danger areas and corresponding driving hazards identified at step 207 and may include information corresponding to the one or more danger areas and the corresponding driving hazards.

Figure 2C:
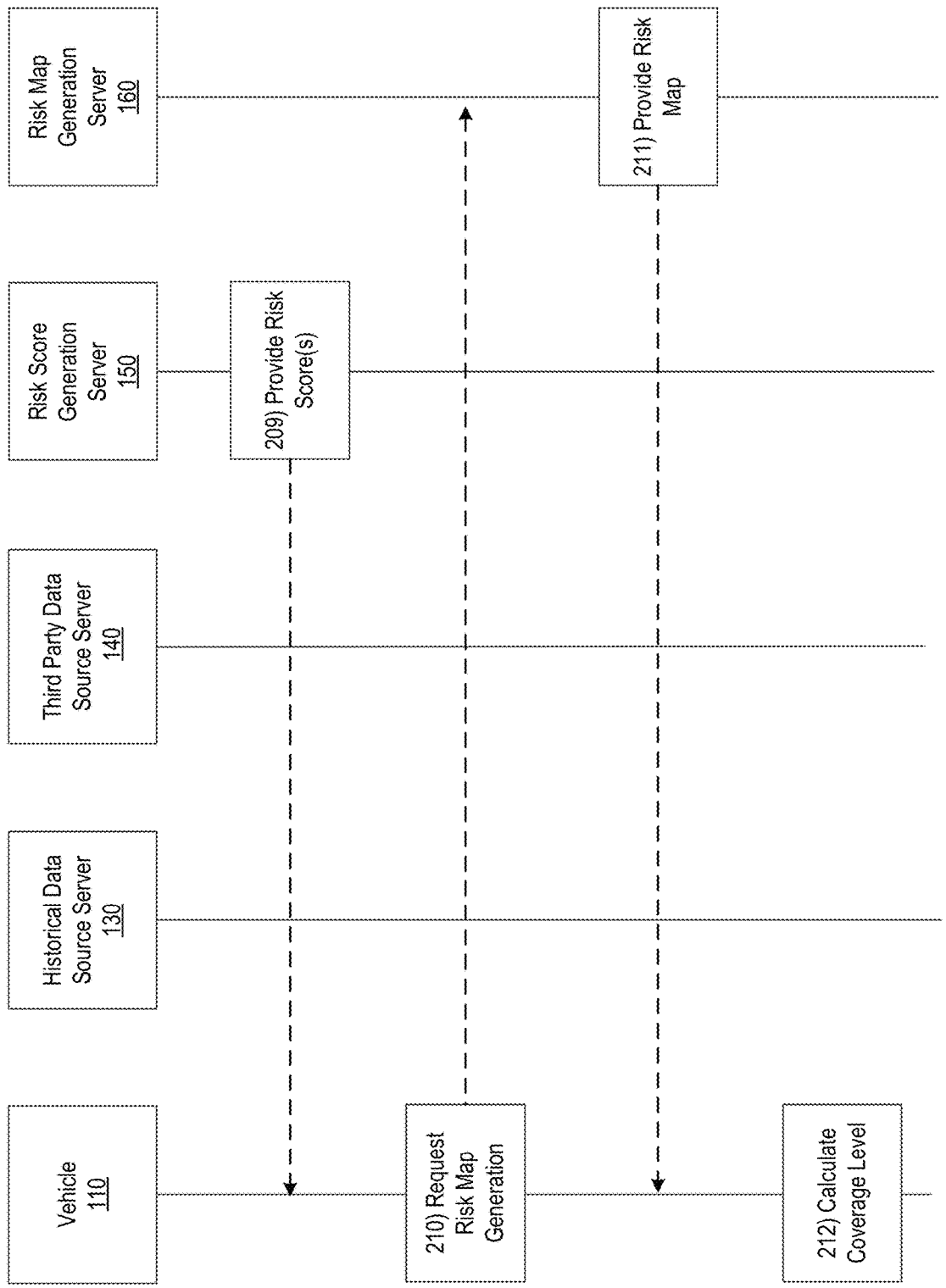

Referring to FIG. 2C, at step 209, risk score generation server 150 may calculate a risk score for the one or more danger areas and/or corresponding driving hazards and provide the calculated risk score for the one or more danger areas and/or corresponding driving hazards to vehicle control computer 116. A risk score may be calculated by risk score generation server 150 for each of the one or more danger areas and/or corresponding driving hazards. In some instances, however, a risk score for the one or more danger areas and/or corresponding driving hazards may be calculated locally at vehicle 110 by vehicle control computer 116. In such instances, processors of vehicle control computer 116 may execute one or more computer-executable instructions corresponding to risk score module 117 which may cause vehicle control computer 116 to calculate a risk score for each of the one or more danger areas and/or corresponding driving hazards. In arrangements where vehicle control computer 116 calculates a risk score for each of the one or more danger areas and/or corresponding driving hazards, steps 208 and 209 may not be performed.

At step 210, vehicle control computer 116 of vehicle 110 may request risk map generation from risk map generation server 160. In doing so, vehicle control computer 116 may provide the risk score data for each of the one or more danger areas and/or corresponding driving hazards to risk map generation server 160. Alternatively, in instances in which risk scores for each of the one or more danger areas and/or corresponding driving hazards are calculated at risk score generation server 150 in an arrangement in which risk score generation server 150 and risk map generation server 160 are configured as modules sharing the same computing device, vehicle control computer 116 may only provide a risk map generation request to the computing device storing the risk score generation module and risk map generation module.

At step 211, risk map generation server 160 may calculate a risk map which incorporates each of the risk scores for the one or more danger areas and/or corresponding driving hazards and may provide the calculated risk map to vehicle control computer 116.

At step 212, vehicle control computer 116 of vehicle 110 may calculate a coverage level and/or premium for the driving instance. In particular, processors of vehicle control computer 116 may execute one or more computer-executable instructions of coverage module 118 which may cause vehicle control computer 116 to calculate an insurance coverage level and/or premium for the driving instance of vehicle 110. The calculation of the coverage level and/or premium for the driving instance of vehicle 110 by vehicle control computer 116 may incorporate historical data provided by historical data source server 130 and/or third party data provided by third party data source server 140. In some instances, the calculation of the coverage level and/or premium may further incorporate previous vehicle operation data provided by vehicle operation sensors 111, GPS 114, and/or telematics device 115 associated with the user/driver of vehicle 110. Additionally and/or alternatively, the calculation of the coverage level and/or premium for the driving instance of vehicle 110 may include risk score data provided by risk score module 117, risk score generation server 150 and/or risk map data provided by risk map generation server 160, and/or a level of operating autonomy of vehicle 110 (e.g., fully-autonomous, semi-autonomous, non-autonomous, and so on). In some instances, the calculation of the coverage level and/or premium for the driving instance of vehicle 110 may incorporate a current Society of Automotive Engineers (e.g., SAE) automation level (e.g., level 0 □ level 5) of vehicle 110 in the driving instance. The coverage level and/or premium may be fixed values corresponding to the entirety of the driving instances and/or may be preliminary and/or starting values which may dynamically increase and/or decrease based on changes to any of the factors discussed herein.

Figure 2D:
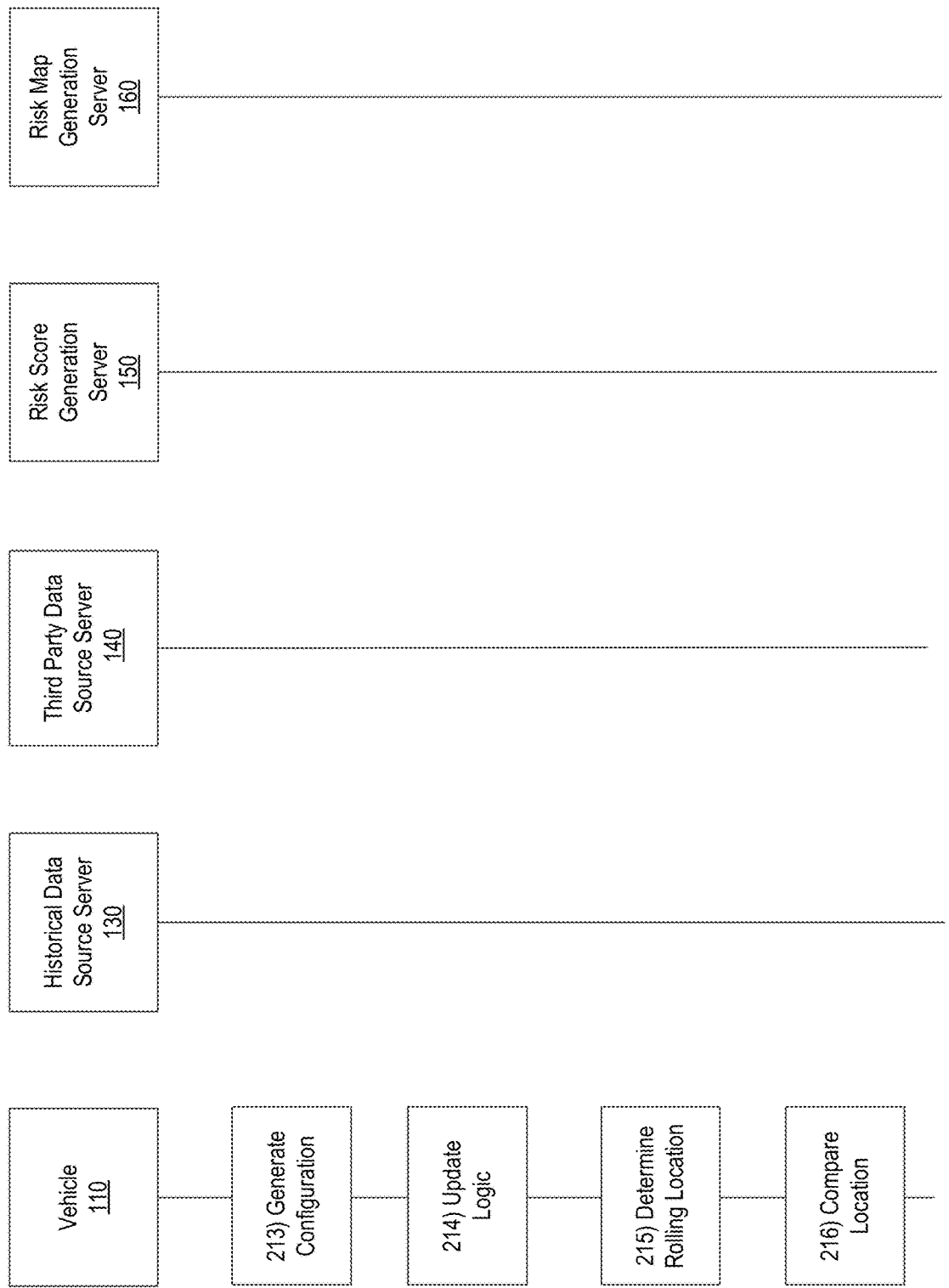

Referring to FIG. 2D, at step 213, vehicle control computer 116 may generate a logical configuration for the operation of vehicle 110 during the driving instance. In particular, vehicle control computer 116 may generate the logical configuration based on one or more of the danger areas and corresponding driving hazards, risk scores, risk map, and/or SAE level of vehicle 110. The logical configuration may cause vehicle control computer 116 to compare an instant location of vehicle 110 during the driving instance with particular locations and/or location areas associated with each of the one or more driving danger areas, increase an assessment priority of the one or more driving hazards corresponding to the location-related driving danger area(s) responsive to determining that the instant location of the vehicle corresponds to at least one of the one or more driving danger areas, and perform one or more of a driving action and a driving alert responsive to identifying at least one of the one or more driving hazards in environmental conditions and surroundings data provided by vehicle operation sensors 111, cameras and proximity sensors 112, and/or vehicles 110a-n via communication systems 113.

At step 214, vehicle control computer 116 may update vehicle operation logic of vehicle 110 based on the logical configuration generated at step 213. The updating of the vehicle operation logic of vehicle 110 may cause vehicle control computer 116 to perform the one or more functions specified by the logical configuration generated at step 213.

At step 215, vehicle control computer 116 of vehicle 110 may determine a rolling location of vehicle 110. In particular, vehicle control computer 116 may activate GPS 114 of vehicle 110 to determine the location of vehicle 110. In some instances, vehicle control computer 116 may query and/or activate one or more of telematics device 115 and mobile device 120 in order to receive location data to determine the location of vehicle 110. The determining of the location of vehicle 110 may be performed by vehicle control computer 116 during operation of vehicle 110 in the vicinity around the location of vehicle 110 identified at step 201 and/or along the route corresponding to the route information received at step 202. Furthermore, the determination of the location of vehicle 110 may occur on a rolling basis at a predetermined time interval (e.g., every 1 second, 10 seconds, 1 minute, and so on) as vehicle 110 operates in the vicinity around the location of vehicle 110 identified at step 201 and/or along the route corresponding to the route information received at step 202.

At step 216, vehicle control computer 116 may compare an instant location of the rolling location of vehicle 110 with locations and/or location areas corresponding to each of the one or more driving danger areas. In particular, vehicle control computer 116 may compare an instant geographical coordinate of vehicle 110 generated in the determination of the rolling location of vehicle 110 with geographical coordinates demarcating the locations and/or location areas corresponding to each of the one or more driving danger areas.

Figure 2E:
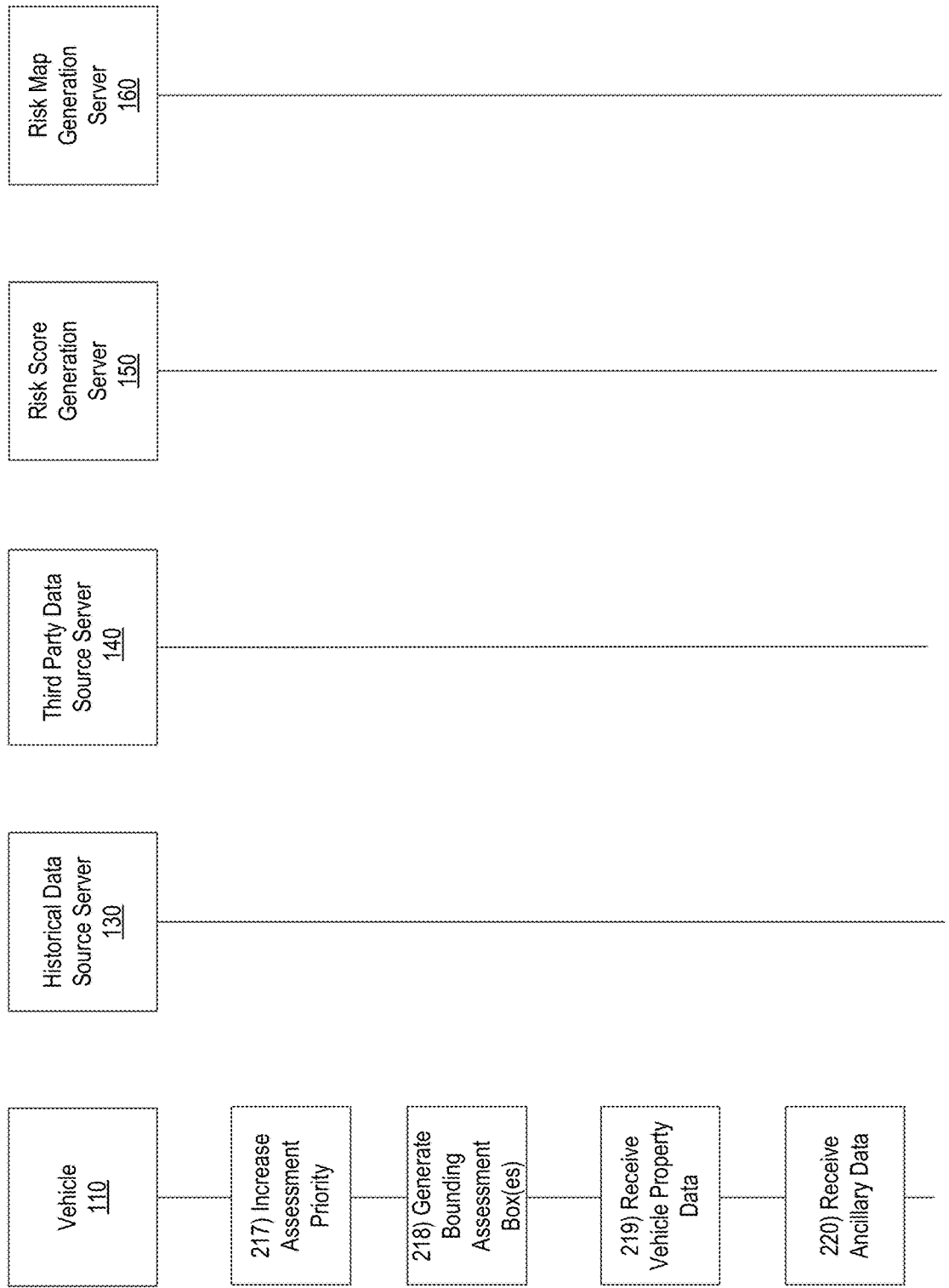

Referring to FIG. 2E, at step 217, vehicle control computer 116 may increase an assessment priority of the one or more driving hazards corresponding to the at least one of the one or more driving danger areas responsive to determining that the instant location of vehicle 110 corresponds to at least one location and/or location area of the one or more driving danger areas. In increasing the assessment priority, vehicle control computer 116 prioritize the analysis of ancillary data for driving hazards associated with the at least one of the one or more driving danger areas.

At step 218, vehicle control computer 116 may generate one or more bounding assessment boxes for the assessment of ancillary data for the one or more driving hazards corresponding to the at least of the one or more driving danger areas. The bounding assessment boxes may correspond to the driving hazards and may establish a frame of reference relating to the driving hazards for the assessment of the driving hazards in the ancillary data. In some instances, the bounding assessment boxes may describe a driving hazard specific reference frame in which the driving hazard was indicated to have occurred in the historical data. As a non-limiting, illustrative example, in the event that the historical data indicated a predetermined amount of driving incidents involving vehicle accidents impacting the left-side portions of vehicles as the vehicles merged onto a highway, then the bounding assessment boxes may focus the analysis of ancillary data for on-coming vehicles on the left-hand side of vehicle 110. As another non-limiting, illustrative example, in the event that the historical data indicated a predetermined amount of driving incidents involving animals impacting the front portions of vehicles as the vehicles traverses a certain section of roadway, then the bounding assessment boxes may focus the analysis of ancillary data for animals crossing the roadway in front, front-right, and front-left portions of vehicle 110.

Bounding boxes are generated by detection systems involving standard Computer Vision and Deep Learning approaches, using models, which may include but are not limited to: Faster R-CNN, MobileNet-SSD, YOLO, Deep-Lab and so on, depending on processing capabilities available. Generated bounding boxes mark the borders of the object discovered, as well as provide additional information on the class/type of object, and the confidence level of detection. Bounding boxes can be average over some duration in order to achieve better confidence level with the lower computing capabilities.

At step 219, vehicle control computer 116 may receive vehicle property data of a plurality of types associated with vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 121 included in mobile computing device 120. The received vehicle performance and operational data may be associated with the general operation of vehicle 110. For example, the received vehicle performance and operational data may include at least the vehicle's speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide vehicle control computer 116 with vehicle make, model, and parts information. Alternatively, such information may be pre-stored in memory associated with vehicle control computer 116. The vehicle performance and operational data may be transmitted by vehicle sensors 111 to the vehicle control computer continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, mobile device 120 associated with a user/driver of vehicle 110 may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications.). The internal vehicle conditions data and mobile device usage indication data may be provided to vehicle control computer 116 continuously and in real-time by vehicle sensors 111, cameras and proximity sensors 112, and mobile device 120.

At step 220, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 218, from the communication systems of one or more additional vehicles 110*a-n*. Vehicle control computer 116 may output a polling request via communication systems 113 for the vehicle performance and operational data and internal vehicle conditions data from one or more additional vehicles 110*a-n*. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110*a-n*. The vehicle performance and operational data and internal vehicle conditions data for one or more additional vehicles 110*a-n* may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 120, and/or third party data source server 140. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. Mobile device 120 and/or third party data source server 140, on the other hand, may provide vehicle control computer 116 with expected and/or forecasted weather data associated with the area corresponding to a location of vehicle 110. Such forecasted weather data may include a likelihood of precipitation, wind, road ice, fog, and the like. The environmental conditions data, as determined by sensors 111, cameras and proximity sensors 112, mobile device 120, and/or third party data source server 140, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 120 (e.g., sensors 121 within the mobile device), a navigation system associated with vehicle control computer 116, and/or third party data source server 140. In particular, vehicle sensors 111 and cameras and proximity sensors 112 may provide traffic data to vehicle control computer 116 as immediately experienced by vehicle 110 in the area surrounding vehicle 110. Mobile device 120, via a navigation application, the on-board navigation system of vehicle control computer 116, and third party data source server 140 may provide vehicle control computer 116 with traffic data associated with the projected route of vehicle 110. Such traffic data may be provided to vehicle control computer 116 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 120 (e.g., crowd sourced navigation application). Road type and road quality data may be provided to vehicle control computer 116 continuously and in real-time.

In some instances steps 219 and 220 may be performed sequentially. In other instances, steps 219 and 220 may be performed simultaneously.

Referring to FIG. 2F, at step 221, vehicle control computer 116 may assess the ancillary data for each of the one or more driving hazards. The assessment of the ancillary data for each of the one or more driving hazards may be prioritized in relation to the assessment of the ancillary data for other driving hazards. In some instances, the assessment of the ancillary data for each of the one or more driving hazards may be in relation to the bounding assessment boxes created at step 218. In such instances, vehicle control computer 116 may use the bounding assessment boxes to focus the assessment of the ancillary data for the driving hazards in an area and/or direction specified by the bounding assessment boxes.

Bounding boxes containing information about the class and boundaries of detected objects allow for identifying elements that do not belong to the scene □such as people on highway, or animals on the road, or, vice versa, find out that something expected to exist is missing □for example a working traffic light. There also exist standard techniques for identifying depth of the image layers that is for estimating the distance to the obstacle. Measures to address the issues can drastically differ depending on the concrete situation/scenario □in particular, they may include certain driving actions.

At step 222, processors associated with the vehicle control computer 116 may execute executable instructions based on the driving configuration generated at step 213, which may cause the vehicle control computer 116 to take any of a plurality of driving actions and/or cause any of a plurality of driving alerts to occur responsive to identifying at least one of the one or more driving hazards. Driving actions may include any one, or combination of, activating the brake, changing lanes, disabling mobile phone 120, disabling application use on mobile phone 120, disabling acceleration, reducing speed, turning on headlights, turning on emergency lights, honking vehicle horn, turning on windshield wipers, and the like. Detection alerts may include any one, or combination of, flashing interior lights, producing an audible sound in the interior of vehicle 110, suggesting an alternate route, providing an indication of upcoming issues on the dashboard and/or heads-up display unit, and the like.

As a non-limiting, illustrative example, vehicle 110 may be traveling at 65 mph on a 2-lane highway in moderate traffic which may be merging left onto a 3-lane highway. Historical data may have been analyzed to identify that the merging area is a driving danger area associated with a driving hazard of vehicle accidents involving impact to the left-side of vehicles merging left onto the 3-lane highway. While in the driving danger area, vehicle control computer 116 may prioritize assessment of ancillary data for vehicles approaching the left-side of vehicle 110 in an unsafe manner amounting to a driving hazard. Cameras and proximity sensors 112 may provide vehicle control computer 116 with data indicating that a vehicle is approaching the left-side of vehicle 110. Vehicle control computer 116 may prioritize assessment of such data based on the driving danger area corresponding to the location of vehicle 110. In some instances, vehicle control computer 116 may assess the ancillary data provided by cameras and proximity sensors 112 based on one or more bounding assessment boxes configured to left-side of vehicle 110. Based on analysis performed by vehicle control computer 116, it may be determined that the vehicle approaching the left-side of vehicle 110 is a driving hazard, and vehicle control computer 116 may execute executable instructions based on the driving configuration at step 213, which may cause vehicle control computer 116 to command vehicle 110 to take any of a plurality of driving actions and/or cause any of a plurality of driving alerts to occur responsive to identifying at least one of the one or more driving hazards. For example, vehicle control computer 116 may cause vehicle 110 to perform any one, or combination of, activating the brake, changing lanes, disabling mobile phone 120, disabling application use on mobile phone 120, disabling acceleration, reducing speed, turning on headlights, turning on emergency lights, honking vehicle horn, turning on windshield wipers, activating various vehicle sensors (e.g., cameras), change lanes, and the like. Additionally and/or alternatively, vehicle control computer 116 may cause vehicle 110 to perform any one, or combination of, flashing interior lights, producing an audible sound in the interior of vehicle 110, providing an indication of upcoming issues on the dashboard and/or heads-up display unit, and the like.

As another non-limiting, illustrative example, vehicle 110 may be traveling at 80 mph on a 2-lane highway in a rural area at night. Historical data may have been analyzed to identify that highway in the rural area is a driving danger area associated with a driving hazard of animals impact the front portion. While in the driving danger area, vehicle control computer 116 may prioritize assessment of ancillary data for animals approaching the front, front-right, and front-left portions of vehicle 110 in an unsafe manner amounting to a driving hazard. Cameras and proximity sensors 112 may provide vehicle control computer 116 with data indicating that an animal is approaching the front-left of vehicle 110. Vehicle control computer 116 may prioritize assessment of such data based on the driving danger area corresponding to the location of vehicle 110. In some instances, vehicle control computer 116 may assess the ancillary data provided by cameras and proximity sensors 112 based on one or more bounding assessment boxes configured to front-left portion of vehicle 110. Based on analysis performed by vehicle control computer 116, it may be determined that the animal approaching the front-left portion of vehicle 110 is a driving hazard, and vehicle control computer 116 may execute executable instructions based on the driving configuration generated at step 213, which may cause the vehicle control computer 116 to command vehicle 110 to take any of a plurality of driving actions and/or cause any of a plurality of driving alerts to occur responsive to identifying at least one of the one or more driving hazards and honk the vehicle horn, as well as provide an indication of animal on the dashboard and/or heads-up display unit.

At step 223, vehicle control computer 116 may calculate an updated coverage level and/or premium. In particular, coverage module 118 may cause vehicle control computer 116 to calculate an increase and/or decrease to the preliminary and/or starting coverage level and/or premium calculated at step 212. In some instances, the calculation of the updated coverage level and/or premium may occur at predetermined time intervals (e.g., every 5 minutes, 10 minutes, 1 hour, and the like), after entering a driving danger area, after exiting a driving danger area, after encountering a driving hazard, and the like. In calculating the updated coverage level and/or premium, vehicle control computer 116 may increase and/or decrease the coverage level and/or premium based on vehicle operation data provided by vehicle operation sensors 111, GPS 114, and/or telematics device 115 and/or ancillary data provided by one or more of cameras and proximity sensors 112 and vehicles 110*a-n*. In some instances, the coverage level and/or premium for vehicle 110 during the driving instance may increase and/or decrease based on changes to the historical data provided by historical data source server 130, third party data provided by third party data source server 140, risk score calculated by risk score module 117 and/or risk score generation server 150, and/or risk map calculated by risk map generation server 160. Additionally and/or alternatively, the coverage level and/or premium for the driving instance of vehicle 110 may also increase and/or decrease based on changes to an autonomous driving setting (e.g., fully autonomous, semi-autonomous, non-autonomous, and the like).

At step 224, vehicle control computer 116 of vehicle 110 may determine a location of vehicle 110. In particular, vehicle control computer 116 may activate GPS 114 of vehicle 110 to determine the location of vehicle 110. In some instances, vehicle control computer 116 may query and/or activate one or more of telematics device 115 and mobile device 120 in order to receive location data to determine the location of vehicle 110.

Referring to FIG. 2G, at step 225, vehicle control computer 116 may identify that the location of vehicle 110 is departed from the vicinity (e.g., first vicinity) for which the historical data was originally requested from historical data source server 130 and the third party data was originally requested from third party data source server 140 and/or that the location of vehicle 110 is departed from the expected driving route.

At step 226, vehicle control computer 116 of vehicle 110 may query third party data source server 140 for environmental data. In particular, vehicle control computer 116 may query third party data source server 140 based on the location (e.g., second location) where vehicle 110 departed from the vicinity (e.g., first vicinity) for which the third party data was previously requested from third party data source server 140 and/or that the location where vehicle 110 departed from the expected driving route.

At step 227, third party data source server 140 may provide the environmental data to vehicle control computer 116. The third party data provided by third party data source server 140 to vehicle control computer 116 may correspond to a new vicinity (e.g., second vicinity) relating to the location at which vehicle 110 departed from the previous vicinity and/or departed from the driving route. In some instances, third party data source server 140 may provide the environmental data to one or more of telematics device 115 and mobile device 120 which in turn may provide the environmental data to vehicle control computer 116 of vehicle 110.

At step 228, vehicle control computer 116 of vehicle 110 may query historical data from historical data source server 130 in order to identify historical incident data relating to the new vicinity (e.g., second vicinity). In particular, vehicle control computer 116 may query historical data source server 130 to identify historical incident data based on the location where vehicle 110 departed from the vicinity for which the historical data was previously requested from historical data source server 130 and/or the location where vehicle 110 departed from the expected driving route.

Figure 2H:
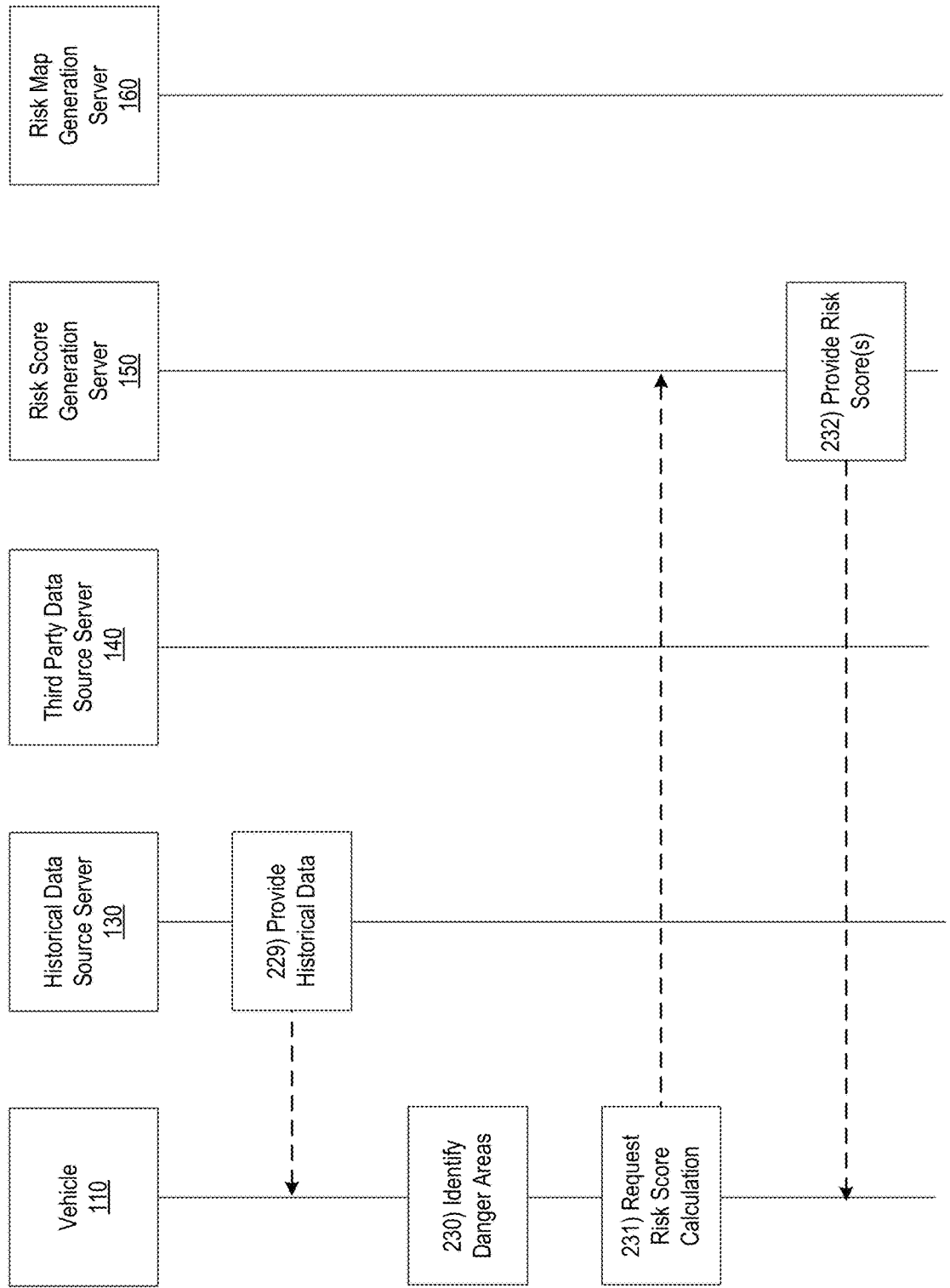

Referring to FIG. 2H, at step 229, historical data source server 130 may provide the historical data to vehicle control computer 116. The historical data provided by historical data source server 130 to vehicle control computer 116 may correspond to a new vicinity relating to the location at which vehicle 110 departed from the previous vicinity and/or departed from the driving route. In some instances, historical data source server 130 may provide the historical data to one or more of telematics device 115 and mobile device 120 which in turn may provide the historical data to vehicle control computer 116 of vehicle 110.

At step 230, vehicle control computer 116 of vehicle 110 may identify one or more driving danger areas in the new vicinity around the location of vehicle 110 based on the historical data provided by historical data source server 130. Each of the one or more danger areas may be associated with one or more driving hazards. At step 231, vehicle control computer 116 may request risk score calculation from risk score generation server 150. In some instances, the request for risk score calculation from vehicle control computer 116 to risk score generation server 150 may include information identifying the one or more danger areas and corresponding driving hazards identified at step 230.

At step 232, risk score generation server 150 may calculate a risk score for the one or more danger areas and/or corresponding driving hazards and may provide the calculated risk score for the one or more danger areas and/or corresponding driving hazards to vehicle control computer 116. A risk score may be calculated by risk score generation server 150 for each of the one or more danger areas and/or corresponding driving hazards. In some instances, however, a risk score for the one or more danger areas and/or corresponding driving hazards may be calculated locally at vehicle 110 by vehicle control computer 116. In such instances, processors of vehicle control computer 116 may execute one or more computer-executable instructions corresponding to risk score module 117 which may cause vehicle control computer 116 to calculate a risk score for each of the one or more danger areas and/or corresponding driving hazards. In arrangements where vehicle control computer 116 calculates a risk score for each of the one or more danger areas and/or corresponding driving hazards, steps 231 and 232 may not be performed.

Referring to FIG. 2I, at step 233, vehicle control computer 116 of vehicle 110 may request risk map generation from risk map generation server 160. In doing so, vehicle control computer 116 may provide the risk score data for each of the one or more danger areas and/or corresponding driving hazards to risk map generation server 160. Alternatively, in instances in which risk scores for each of the one or more danger areas and/or corresponding driving hazards are calculated at risk score generation server 150 in an arrangement in which risk score generation server 150 and risk map generation server 160 are configured as modules sharing the same computing device, vehicle control computer 116 may only provide a risk map generation request to the computing device storing the risk score generation module and risk map generation module. At step 234, risk map generation server 160 may calculate a risk map which incorporates each of the risk scores for the one or more danger areas and/or corresponding driving hazards and may provide the calculated risk map to vehicle control computer 116.

At step 235, vehicle control computer 116 may generate a logical configuration for the operation of vehicle 110 during the driving instance. In particular, vehicle control computer 116 may generate the logical configuration based on one or more of the danger areas and corresponding driving hazards, risk scores, risk map, and/or SAE level of vehicle 110. At step 236, vehicle control computer 116 may update vehicle operation logic of vehicle 110 based on the logical configuration generated at step 235. The updating of the vehicle operation logic of vehicle 110 may cause vehicle control computer 116 to perform the one or more functions specified by the logical configuration generated at step 235.

Figure 2J:
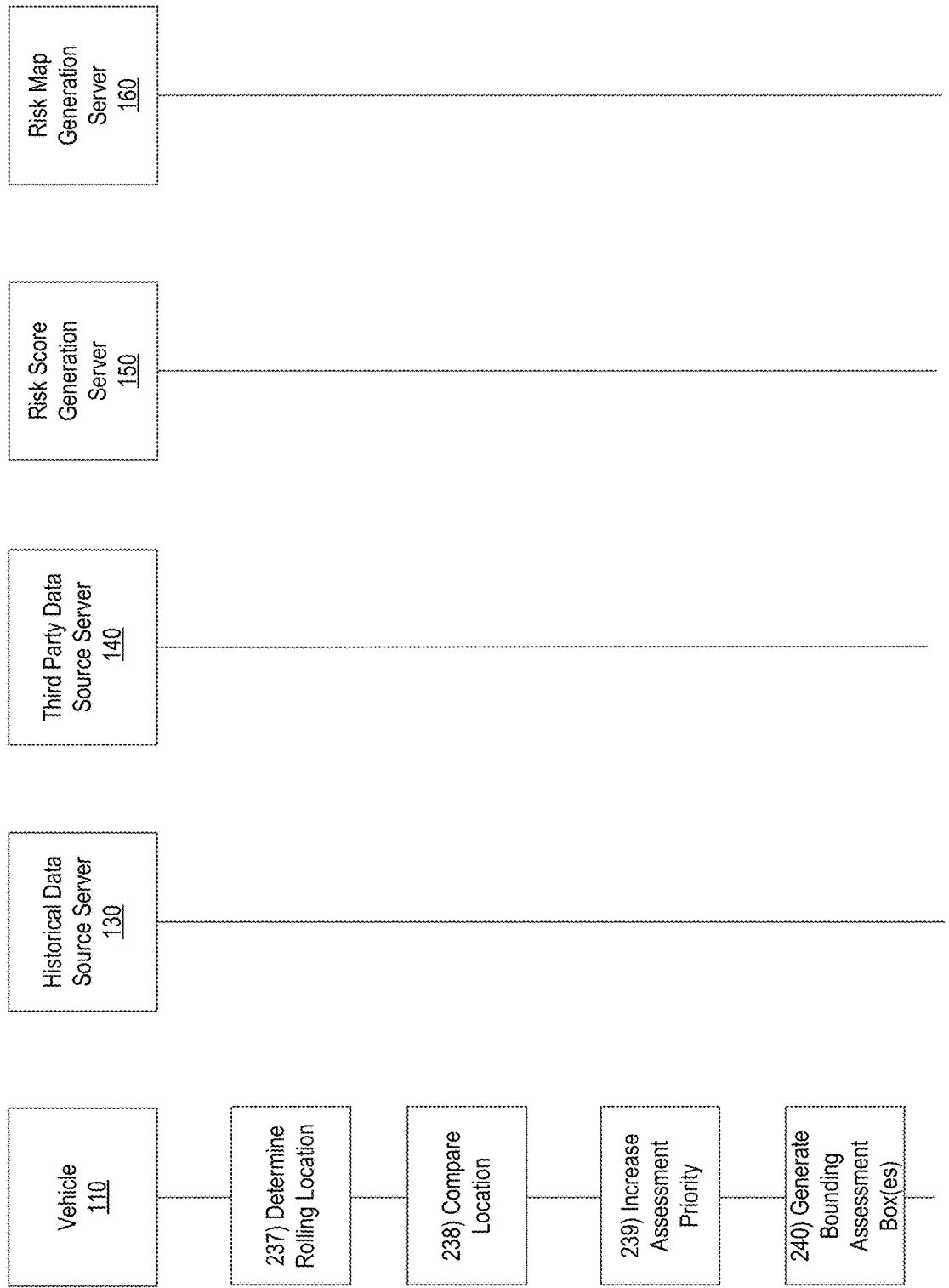

Referring to FIG. 2J, at step 237, vehicle control computer 116 of vehicle 110 may determine a rolling location of vehicle 110. In particular, vehicle control computer 116 may activate GPS 114 of vehicle 110 to determine the location of vehicle 110. In some instances, vehicle control computer 116 may query and/or activate one or more of telematics device 115 and mobile device 120 in order to receive location data to determine the location of vehicle 110. The determining of the location of vehicle 110 may be performed by vehicle control computer 116 during operation of vehicle 110 in the vicinity around the location of vehicle 110 identified at step 224. Furthermore, the determination of the location of vehicle 110 may occur on a rolling basis at a predetermined time interval (e.g., every 1 second, 10 seconds, 1 minute, and so on) as vehicle 110 operates in the vicinity around the location of vehicle 110 identified at step 224.

At step 238, vehicle control computer 116 may compare an instant location of the rolling location of vehicle 110 with locations and/or location areas corresponding to each of the one or more driving danger areas. In particular, vehicle control computer 116 may compare an instant geographical coordinate of vehicle 110 generated in the determination of the rolling location of vehicle 110 with geographical coordinates demarcating the locations and/or location areas corresponding to each of the one or more driving danger areas.

At step 239, vehicle control computer 116 may increase an assessment priority of the one or more driving hazards corresponding to the at least one of the one or more driving danger areas responsive to determining that the instant location of vehicle 110 corresponds to at least one location and/or location area of the one or more driving danger areas. In increasing the assessment priority, vehicle control computer 116 prioritize the analysis of ancillary data for driving hazards associated with the at least one of the one or more driving danger areas.

At step 240, vehicle control computer 116 may generate one or more bounding assessment boxes for the assessment of ancillary data for the one or more driving hazards corresponding to the at least of the one or more driving danger areas. The bounding assessment boxes may correspond to the driving hazards and may establish a frame of reference relating to the driving hazards for the assessment of the driving hazards in the ancillary data. In some instances, the bounding assessment boxes may describe a driving hazard specific reference frame in which the driving hazard was indicated to have occurred in the historical data.

Referring to FIG. 2K, at step 241, vehicle control computer 116 may receive vehicle property data of a plurality of types associated with vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 121 included in mobile computing device 120. The received vehicle performance and operational data may be associated with the general operation of vehicle 110. For example, the received vehicle performance and operational data may include at least the vehicle's speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide vehicle control computer 116 with vehicle make, model, and parts information. Alternatively, such information may be pre-stored in memory associated with vehicle control computer 116. The vehicle performance and operational data may be transmitted by vehicle sensors 111 to the vehicle control computer continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, mobile device 120 associated with a user/driver of vehicle 110 may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications.). The internal vehicle conditions data and mobile device usage indication data may be provided to vehicle control computer 116 continuously and in real-time by vehicle sensors 111, cameras and proximity sensors 112, and mobile device 120.

At step 242, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 218, from the communication systems of one or more additional vehicles 110a-n. Vehicle control computer 116 may output a polling request via communication systems 113 for the vehicle performance and operational data and internal vehicle conditions data from one or more additional vehicles 110a-n. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110a-n. The vehicle performance and operational data and internal vehicle conditions data for one or more additional vehicles 110a-n may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 120, and/or third party data source server 140. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. Mobile device 120 and/or third party data source server 140, on the other hand, may provide vehicle control computer 116 with expected and/or forecasted weather data associated with the area corresponding to a location of vehicle 110. Such forecasted weather data may include a likelihood of precipitation, wind, road ice, fog, and the like. The environmental conditions data, as determined by sensors 111, cameras and proximity sensors 112, mobile device 120, and/or third party data source server 140, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 120 (e.g., sensors 121 within the mobile device), a navigation system associated with vehicle control computer 116, and/or third party data source server 140. In particular, vehicle sensors 111 and cameras and proximity sensors 112 may provide traffic data to vehicle control computer 116 as immediately experienced by vehicle 110 in the area surrounding vehicle 110. Mobile device 120, via a navigation application, the on-board navigation system of vehicle control computer 116, and third party data source server 140 may provide vehicle control computer 116 with traffic data associated with the projected route of vehicle 110. Such traffic data may be provided to vehicle control computer 116 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 120 (e.g., crowd sourced navigation application). Road type and road quality data may be provided to vehicle control computer 116 continuously and in real-time.

In some instances steps 241 and 242 may be performed sequentially. In other instances, steps 241 and 242 may be performed simultaneously.

At step 243, vehicle control computer 116 may assess the ancillary data for each of the one or more driving hazards. The assessment of the ancillary data for each of the one or more driving hazards may be prioritized in relation to the assessment of the ancillary data for other driving hazards. In some instances, the assessment of the ancillary data for each of the one or more driving hazards may be in relation to the bounding assessment boxes created at step 240. In such instances, vehicle control computer 116 may use the bounding assessment boxes to focus the assessment of the ancillary data for the driving hazards in an area and/or direction specified by the bounding assessment boxes.

At step 244, processors associated with the vehicle control computer 116 may execute instructions based on the driving configuration generated at step 235, which may cause the vehicle control computer 116 to take any of a plurality of driving actions and/or cause any of a plurality of driving alerts to occur responsive to identifying at least one of the one or more driving hazards. Driving actions may include any one, or combination of, activating the brake, changing lanes, disabling mobile phone 120, disabling application use on mobile phone 120, disabling acceleration, reducing speed, turning on headlights, turning on emergency lights, honking vehicle horn, turning on windshield wipers, and the like. Detection alerts may include any one, or combination of, flashing interior lights, producing an audible sound in the interior of vehicle 110, suggesting an alternate route, providing an indication of upcoming issues on the dashboard and/or heads-up display unit, and the like.

Figure 3:
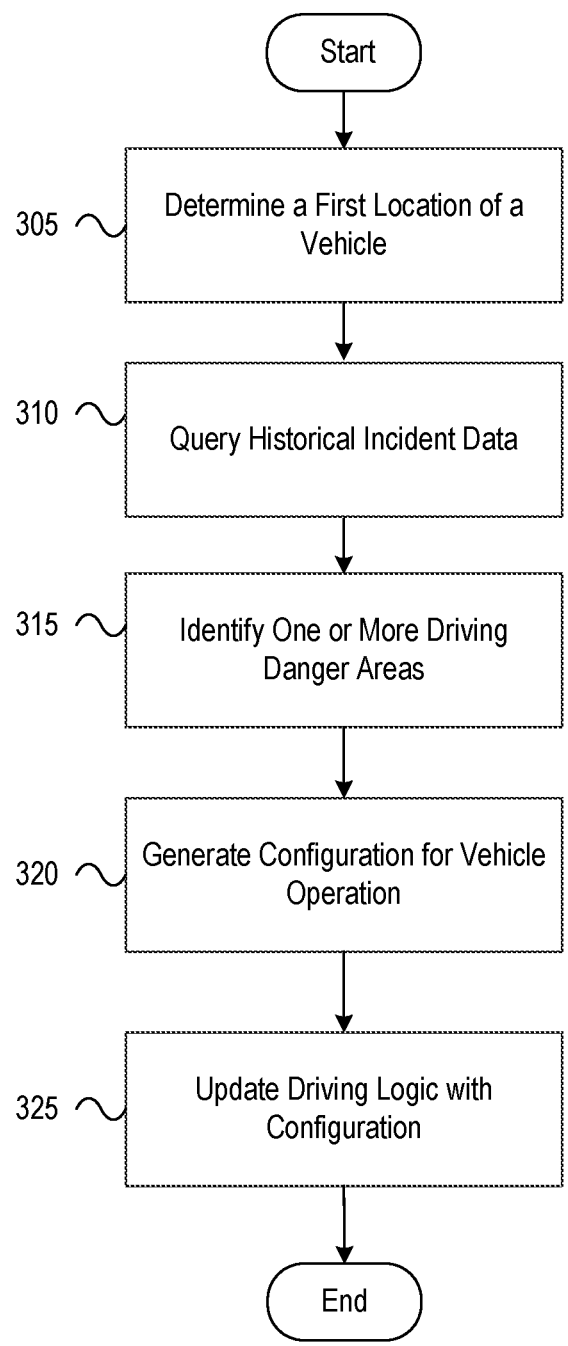
FIG. 3 depicts an illustrative method for the preemptive logical configuration of vehicle control systems in accordance with one or more aspects of the disclosure.

FIG. 3 depicts an illustrative method for the preemptive logical configuration of vehicle control systems according to one or more aspects of the disclosure. Referring to FIG. 3, at step 305, a vehicle control computer may determine a first location of a vehicle. At step 310, the vehicle control computer may query a historical data source server for historical incident data corresponding to a first vicinity around the first location of the vehicle. At step 315, the vehicle control computer may identify one or more driving danger areas in the first vicinity around the first location of the vehicle based on the historical incident data, wherein each of the one or more driving danger areas are associated with one or more driving hazards. At step 320, the vehicle control computer may generate a configuration for vehicle operation in the first vicinity around the first location of the vehicle based on the one or more driving danger areas. At step 325, the vehicle control computer may update driving logic of the vehicle with the configuration.

FIG. 4 depicts an example network environment and computing system 400 that may be used to implement aspects of the disclosure. Computing system 400 may include a computing device 401, which may have a processor 403 for controlling overall operation of computing device 401 and its associated components, including RAM 405, ROM 407, input/output module 409, and memory unit 415. Computing device 401, along with one or more additional devices (e.g., terminals 441, 451) may correspond to any of multiple systems or devices, such as vehicle control systems and/or devices, configured as described herein for receiving data from various sources, identifying one or more danger areas associated with driving hazards in the vicinity of a vehicle, configuring autonomous and/or semi-autonomous vehicle operations based on identification of the one or more danger areas associated with driving hazards in the vicinity of the vehicle, and causing the vehicle to perform one or more of a driving action and a driving alert responsive to identifying driving hazards in environmental data, as well as other functions.

Input/Output (I/O) module 409 may include a microphone, keypad, touch screen, and/or stylus through which a user of computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling computing device 401 to perform various functions. For example, memory unit 415 may store software used by computing device 401, such as an operating system 417, application programs 419, and an associated internal database 421. Memory unit 415 may include one or more of volatile and/or non-volatile computer memory to store computer-executable instructions, data, and/or other information. Processor 403 and its associated components may allow computing device 401 to execute a series of computer-readable instructions to receive data from various sources, identify one or more danger areas associated with driving hazards in the vicinity of a vehicle, configure autonomous and/or semi-autonomous vehicle operations based on identification of the one or more danger areas associated with driving hazards in the vicinity of the vehicle, and cause the vehicle to perform one or more of a driving action and a driving alert responsive to identifying driving hazards in environmental data, as well as to perform other functions.

Computing device 401 may operate in a networked environment 400 supporting connections to one or more remote computers, such as terminals/devices 441 and 451. Computing device 401, and related terminals/devices 441 and 451, may include devices installed in vehicles, mobile devices that may travel within vehicles, or devices outside of vehicles that are configured to receive and process vehicle and other sensor data. Thus, computing device 401 and terminals/devices 441 and 451 may each include personal computers (e.g., laptop, desktop, or tablet computers), servers (e.g., web servers, database servers), vehicle-based devices (e.g., on-board vehicle computers, vehicle communication systems, sensors, and telematics devices), or mobile communication devices (e.g., mobile phones, portable computing devices, and the like), and may include some or all of the elements described above with respect to the computing device 401. The network connections depicted in FIG. 4 include a local area network (LAN) 425 and a wide area network (WAN) 429, and a wireless telecommunications network 433, but may also include other networks. When used in a LAN networking environment, computing device 401 may be connected to LAN 425 through a network interface or adapter 423. When used in a WAN networking environment, computing device 401 may include a modem 427 or other means for establishing communications over WAN 429, such as network 431 (e.g., the Internet). When used in a wireless telecommunications network 433, computing device 401 may include one or more transceivers, digital signal processors, and additional circuitry and software for communicating with wireless computing devices 441 (e.g., mobile phones, vehicle communication systems, vehicle sensors, and telematics devices) via one or more network devices 435 (e.g., base transceiver stations) in wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 419 used by computing device 401 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   determining a first location of a vehicle;
   querying historical incident data corresponding to a first vicinity around the first location of the vehicle;
   based on the historical incident data, identifying one or more driving danger areas in the first vicinity, wherein each of the one or more driving danger areas are associated with one or more driving hazards;
   generating, based on identifying the one or more driving danger areas, a configuration for vehicle operation in the first vicinity, wherein the configuration comprises instructions for the vehicle to perform one or more driving actions in response to detecting the one or more driving hazards;
   updating vehicle operation logic of a vehicle control computer of the vehicle with the configuration; and
   responsive to detecting at least one of the one or more driving hazards during the vehicle operation in the first vicinity, causing the vehicle to perform at least one of the one or more driving actions in accordance with the configuration.

2. The method of claim 1, further comprising:
   during the vehicle operation in the first vicinity, comparing a first instant location of the vehicle with each of the one or more driving danger areas; and
   responsive to determining that the first instant location of the vehicle corresponds to at least one of the one or more driving danger areas, increasing an assessment priority of the one or more driving hazards corresponding to the at least one of the one or more driving danger areas.

3. The method of claim 1, further comprising:
   receiving ancillary data associated with surroundings of the vehicle;
   assessing the ancillary data based on prioritizing at least a portion of the ancillary data for assessment for the one or more driving hazards; and
   identifying, based on assessing the ancillary data, the at least one of the one or more driving hazards.

4. The method of claim 3, wherein the ancillary data comprises one or more images, and
   wherein prioritizing at least a portion of the ancillary data for assessment for the one or more driving hazards comprises:
   generating one or more bounding assessment boxes to mark borders of one or more objects detected in the ancillary data; and
   focusing the assessment of the ancillary data to a portion of the ancillary data indicated by the bounding assessment boxes.

5. The method of claim 1, further comprising:
   receiving an expected driving route from the first location of the vehicle to a destination point; and
   identifying the historical incident data relative to the expected driving route,
   wherein identifying the one or more driving danger areas is performed relative to the expected driving route.

6. The method of claim 1, wherein the configuration further comprises one or more driving alerts to be performed by the vehicle in response to detecting the one or more driving hazards, and
   wherein the method further comprises, responsive to detecting the at least one of the one or more driving hazards during the vehicle operation in the first vicinity, performing at least one of the one or more of the driving alerts based on the configuration for vehicle operation.

7. The method of claim 1, wherein the one or more driving actions comprise: activating a brake of the vehicle, causing the vehicle to change lanes, disabling acceleration of the vehicle, reducing a speed of the vehicle, turning on headlights of the vehicle, turning on emergency lights of the vehicle, honking a horn of the vehicle, or turning on windshield wipers of the vehicle.

8. An apparatus, comprising:
a processor; and
a memory storing computer-readable instructions that, when executed by the processor, cause the apparatus to:
determine a first location of a vehicle;
query historical incident data corresponding to a first vicinity around the first location of the vehicle;
based on the historical incident data, identify one or more driving danger areas in the first vicinity, wherein each of the one or more driving danger areas are associated with one or more driving hazards;
generate, based on identifying the one or more driving danger areas, a configuration for vehicle operation in the first vicinity, wherein the configuration comprises instructions for the vehicle to perform one or more driving actions in response to detecting the one or more driving hazards;
update vehicle operation logic of a vehicle control computer of the vehicle with the configuration; and
responsive to detecting at least one of the one or more driving hazards during the vehicle operation in the first vicinity, cause the vehicle to perform at least one of the one or more driving actions in accordance with the configuration.

9. The apparatus of claim 8, wherein the memory stores further computer-readable instructions that, when executed by the processor, cause the apparatus to:
during the vehicle operation in the first vicinity, compare a first instant location of the vehicle with each of the one or more driving danger areas; and
responsive to determining that the first instant location of the vehicle corresponds to at least one of the one or more driving danger areas, increase an assessment priority of the one or more driving hazards corresponding to the at least one of the one or more driving danger areas.

10. The apparatus of claim 8, wherein the memory stores further computer-readable instructions that, when executed by the processor, cause the apparatus to:
receive ancillary data associated with surroundings of the vehicle;
assess the ancillary data based on prioritizing at least a portion of the ancillary data for assessment for the one or more driving hazards; and
identify, based on assessing the ancillary data, the at least one of the one or more driving hazards.

11. The apparatus of claim 8, wherein the memory stores further computer-readable instructions that, when executed by the processor, cause the apparatus to:
receive an expected driving route from the first location of the vehicle to a destination point; and
identify the historical incident data relative to the expected driving route,
wherein identifying the one or more driving danger areas is performed relative to the expected driving route.

12. The apparatus of claim 8, wherein the memory stores further computer-readable instructions that, when executed by the processor, cause the apparatus to:
determine a risk score for each of the one or more driving danger areas,
wherein the configuration is further generated based on an autonomous level of the vehicle and one or more risk scores associated with the one or more driving danger areas.

13. The apparatus of claim 8, wherein the memory stores further computer-readable instructions that, when executed by the processor, cause the apparatus to:
calculate, based on the historical incident data corresponding to the first vicinity, a starting insurance coverage level for a driving trip associated with the first vicinity.

14. The apparatus of claim 8, wherein the memory stores further computer-readable instructions that, when executed by the processor, cause the apparatus to:
during the vehicle operation, periodically determine whether to adjust the starting insurance coverage level for the driving trip based on determining that the vehicle has entered the one or more driving danger areas, has exited the one or more driving danger areas, or has encountered the one or more driving hazards.

15. One or more non-transitory, computer-readable media storing instructions that, when executed by a computing device comprising at least one processor and memory, cause the computing device to:
determine a first location of a vehicle;
query historical incident data corresponding to a first vicinity around the first location of the vehicle;
based on the historical incident data, identify one or more driving danger areas in the first vicinity, wherein each of the one or more driving danger areas are associated with one or more driving hazards;
generate, based on identifying the one or more driving danger areas, a configuration for vehicle operation in the first vicinity, wherein the configuration comprises instructions for the vehicle to perform one or more driving actions in response to detecting the one or more driving hazards;
update vehicle operation logic of a vehicle control computer of the vehicle with the configuration; and
responsive to detecting at least one of the one or more driving hazards during the vehicle operation in the first vicinity, cause the vehicle to perform at least one of the one or more driving actions in accordance with the configuration.

16. The one or more non-transitory, computer-readable media of claim 15 storing further instructions that, when executed by the computing device comprising the at least one processor and memory, cause the computing device to:
during the vehicle operation in the first vicinity, compare a first instant location of the vehicle with each of the one or more driving danger areas; and
responsive to determining that the first instant location of the vehicle corresponds to at least one of the one or more driving danger areas, increase an assessment priority of the one or more driving hazards corresponding to the at least one of the one or more driving danger areas.

17. The one or more non-transitory computer-readable media of claim 15 storing further instructions that, when executed by the computing device comprising the at least one processor and memory, cause the computing device to:
receive ancillary data associated with surroundings of the vehicle;
assess the ancillary data based on prioritizing at least a portion of the ancillary data for assessment for the one or more driving hazards; and
identify, based on assessing the ancillary data, the at least one of the one or more driving hazards.

18. The one or more non-transitory computer-readable media of claim 15 storing further instructions that, when executed by the computing device comprising the at least one processor and memory, cause the computing device to:
- receive an expected driving route from the first location of the vehicle to a destination point; and
- identify the historical incident data relative to the expected driving route,
- wherein identifying the one or more driving danger areas is performed relative to the expected driving route.

19. The one or more non-transitory, computer-readable media of claim 17, wherein the ancillary data comprises an image, and
- wherein prioritizing at least a portion of the ancillary data for assessment for the one or more driving hazards comprises:
  - generating a bounding assessment box to mark boundaries of a portion of the image; and
  - focusing the assessment of the ancillary data to an area of the image indicated by the bounding assessment box.

20. The one or more non-transitory, computer-readable media of claim 19, wherein identifying, based on assessing the ancillary data, the at least one of the one or more driving hazards comprises:
- identifying at least one of the following:
  - one or more elements that do not belong to a scene identified in the bounding assessment box, or
  - one or more elements missing from the scene identified in the bounding assessment box.

* * * * *